United States Patent [19]

Jensen, Jr.

[11] Patent Number: 4,795,513
[45] Date of Patent: Jan. 3, 1989

[54] METHOD AND APPARATUS FOR PRODUCING A LAMINATED COMPOSITE MATERIAL HAVING PERFORATED INNER LAYER

[75] Inventor: James W. Jensen, Jr., Boulder, Colo.

[73] Assignee: Adolph Coors Company, Golden, Colo.

[21] Appl. No.: 923,421

[22] Filed: Oct. 27, 1986

Related U.S. Application Data

[63] Continuation-in-part of Ser. No. 462,917, Feb. 1, 1983, Pat. No. 4,549,917, and Ser. No. 751,941, Jul. 5, 1985, abandoned.

[51] Int. Cl.$^4$ ............................................. B32B 31/18
[52] U.S. Cl. ................................. 156/108; 156/252; 156/256; 156/263; 156/353; 156/356; 156/361; 156/390; 156/510; 156/514; 156/517; 156/529
[58] Field of Search ............... 156/108, 252, 256, 263, 156/353, 360, 356, 361, 390, 510, 513, 514, 517, 529; 53/170, 172, 175; 206/158, 160, 627; 428/204, 205, 215; 226/2, 3, 11, 15, 16, 17, 24, 29, 195

[56] References Cited

U.S. PATENT DOCUMENTS

| | | | |
|---|---|---|---|
| 1,756,150 | 4/1930 | Ganz | 229/7 R |
| 1,994,923 | 3/1935 | Ross | 229/17 R |
| 2,284,872 | 6/1942 | Jaeger et al. | 156/514 |
| 2,511,303 | 6/1950 | Stevens et al. | 156/108 |
| 3,057,534 | 10/1962 | Silver | 229/17 R |
| 3,083,890 | 4/1963 | Ignell | 220/16 |
| 3,459,625 | 8/1969 | Heller, Jr. et al. | 156/256 |
| 3,565,730 | 2/1971 | Weisshuhn | 156/514 |
| 3,645,822 | 2/1972 | Widiger et al. | 229/3.5 R |
| 3,770,185 | 11/1973 | Reeves | 229/17 G |
| 3,861,577 | 1/1975 | Druyts | 229/7 R |
| 3,957,180 | 5/1976 | Skillman | 222/528 |
| 4,254,173 | 3/1981 | Peer, Jr. | 428/204 |
| 4,308,956 | 1/1982 | Steinke et al. | 206/611 |
| 4,362,245 | 12/1982 | Kuchenbecker | 206/621 |
| 4,496,417 | 1/1985 | Haake et al. | 156/361 |
| 4,549,917 | 10/1985 | Jensen | 156/108 |
| 4,610,739 | 9/1986 | Jensen | 156/361 |

FOREIGN PATENT DOCUMENTS

| | | | |
|---|---|---|---|
| 984552 | 7/1951 | France | 229/37 R |
| 54283 | 8/1934 | Norway | 229/37 R |
| 840545 | 3/1984 | South Africa . | |
| 845644 | 3/1985 | South Africa . | |
| 93254 | 11/1938 | Sweden | 229/37 R |
| 423610 | 5/1967 | Switzerland | 229/17 R |
| 1168539 | 10/1969 | United Kingdom | 156/108 |

Primary Examiner—Caleb Weston
Attorney, Agent, or Firm—Klaas & Law

[57] ABSTRACT

A device and method for forming a moving web of laminated composite material having weakened zones therein from a moving continuous web of relatively extensible plastic film material, having identical sets of graphics printed on nominally constant length repeat length portions thereof which are subject to length variation from a constant design repeat length distance, and a moving continuous web of relatively nonextensible paper material. A method and device for forming a three-layered composite material having weakened zones therein is also described. Carton blanks and liquid tight cartons having tear away tab portions formed from such three-layered composite material are also described.

20 Claims, 19 Drawing Sheets

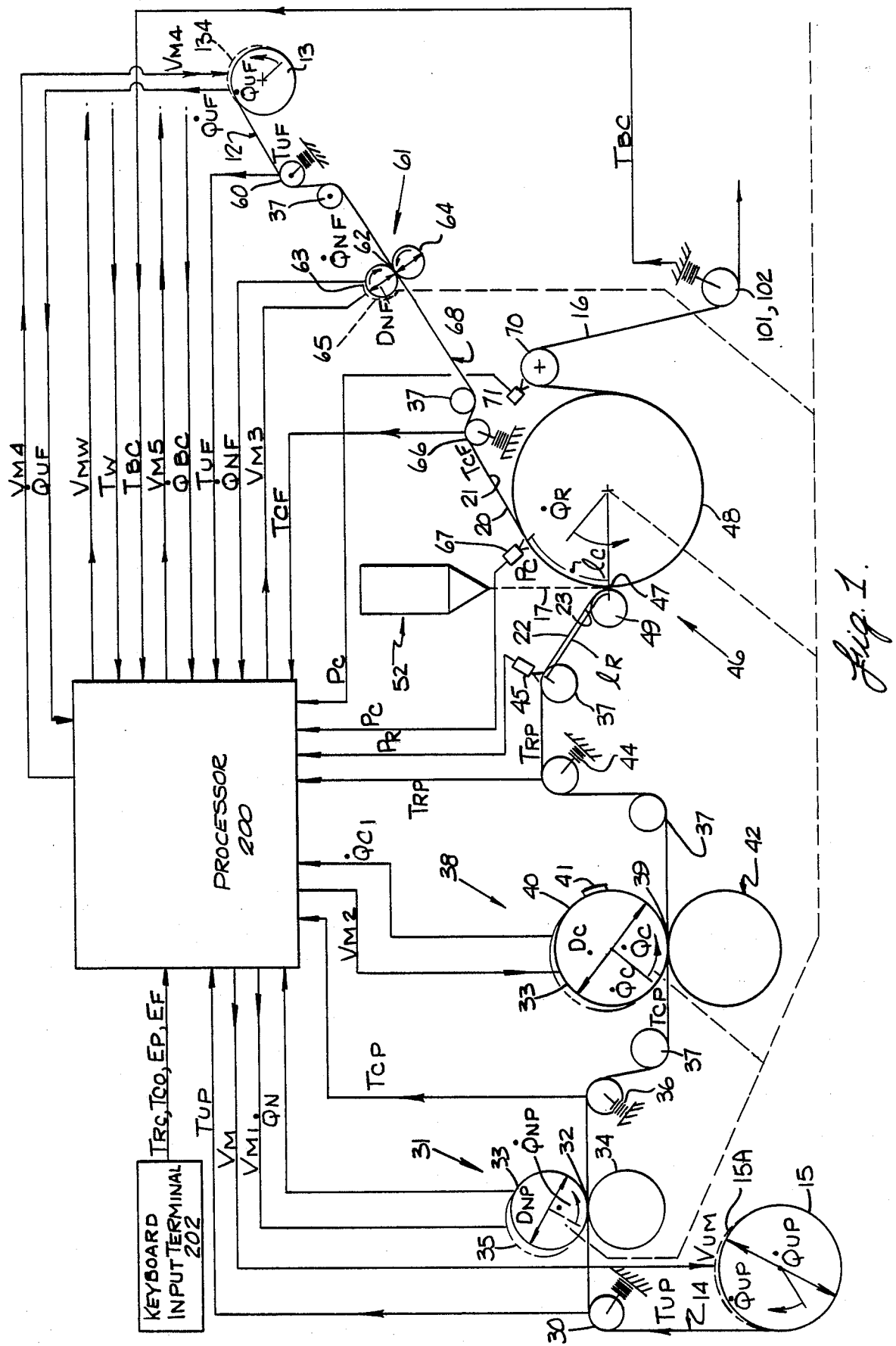

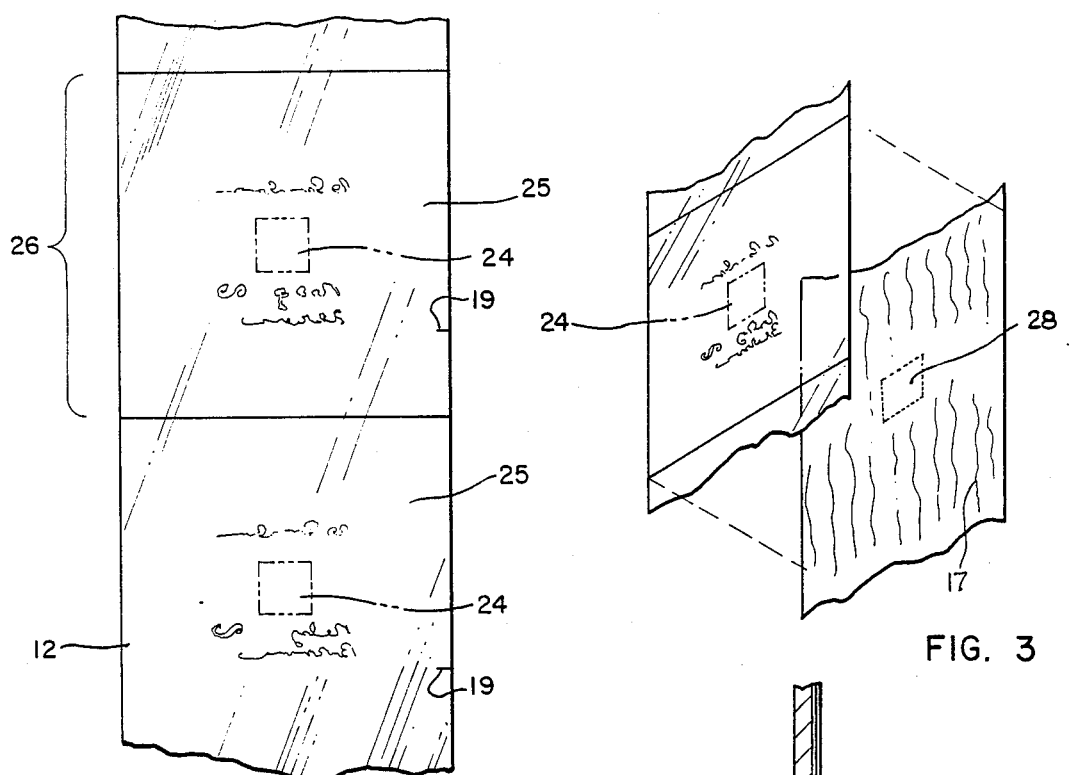
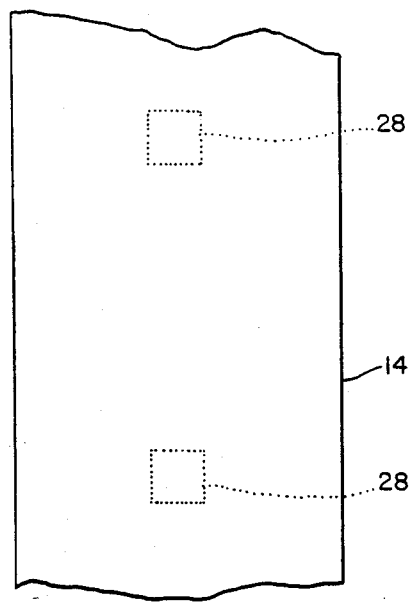
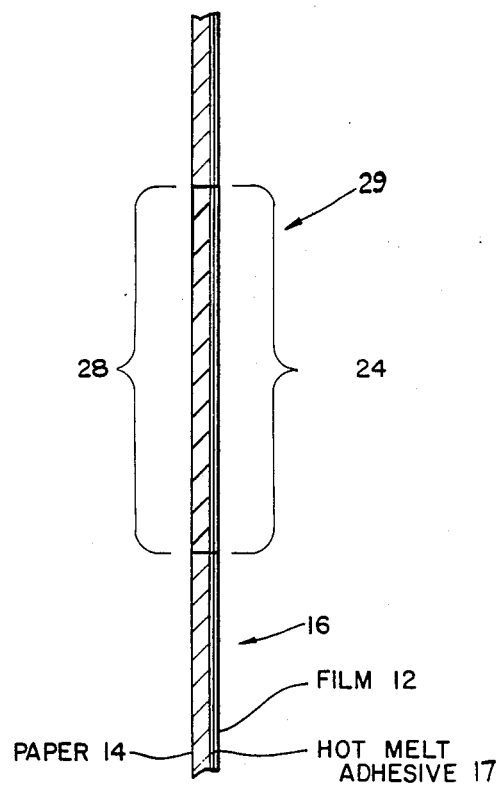
FIG. 2
FIG. 3
FIG. 4

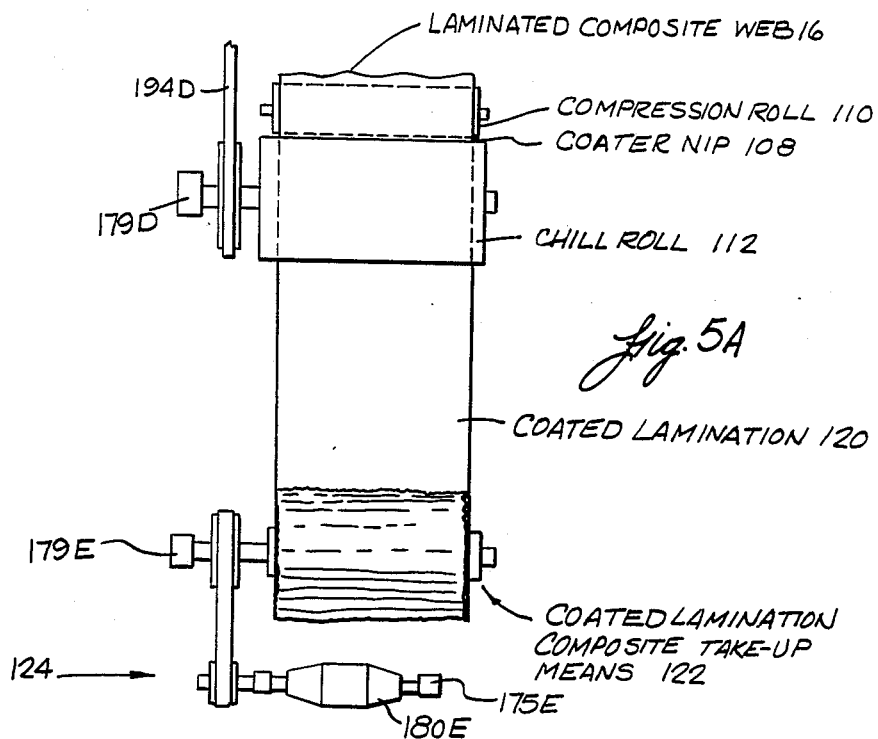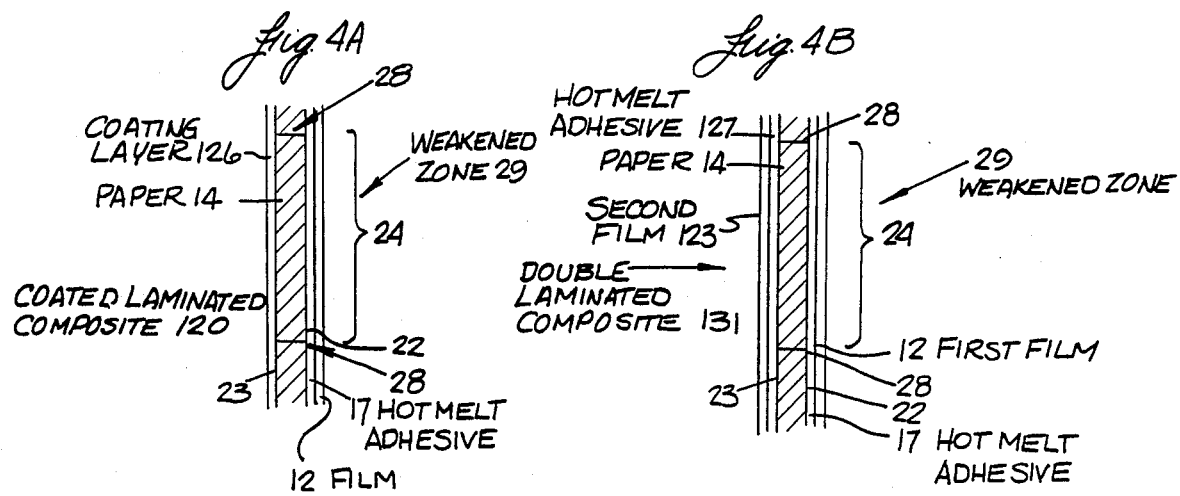

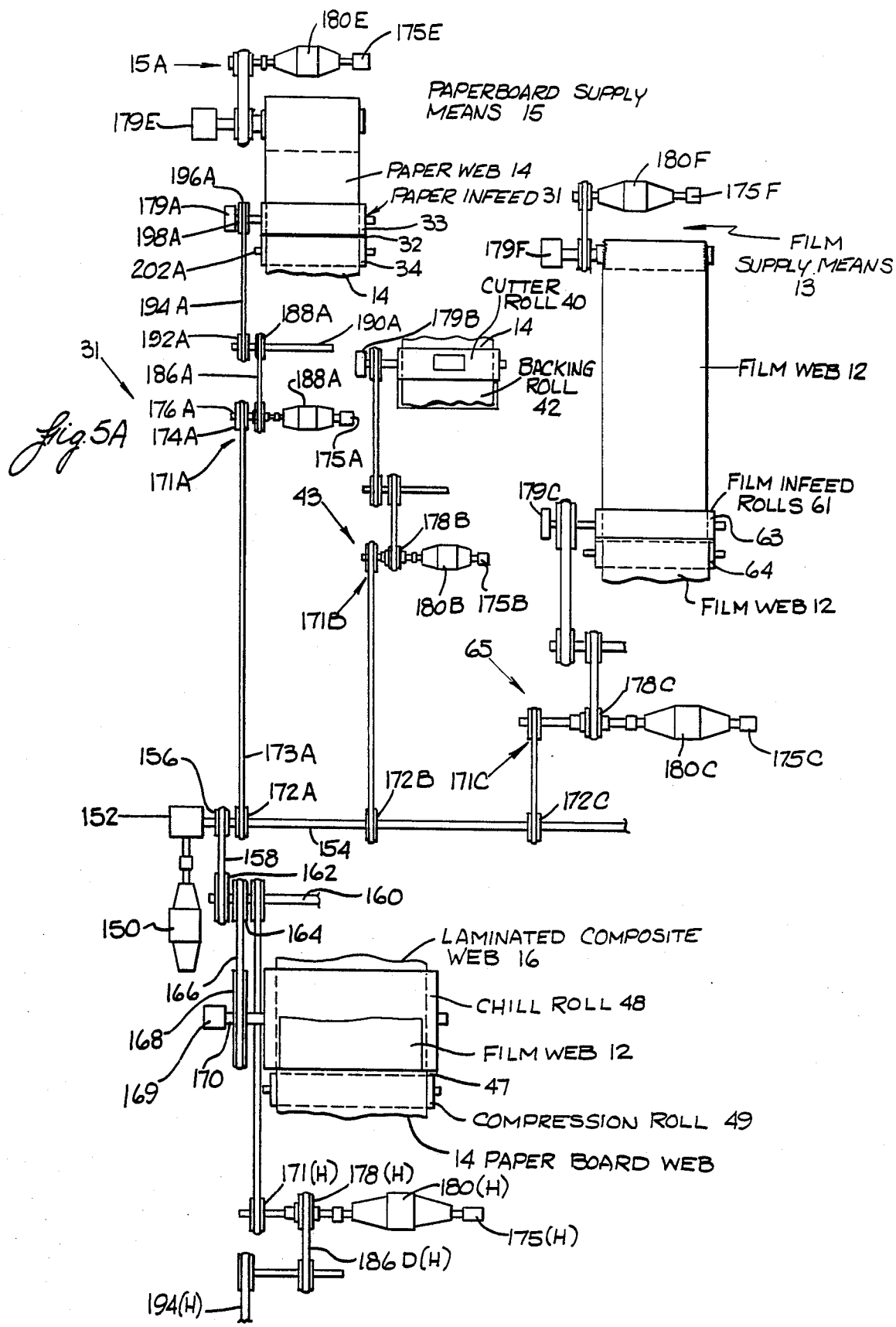

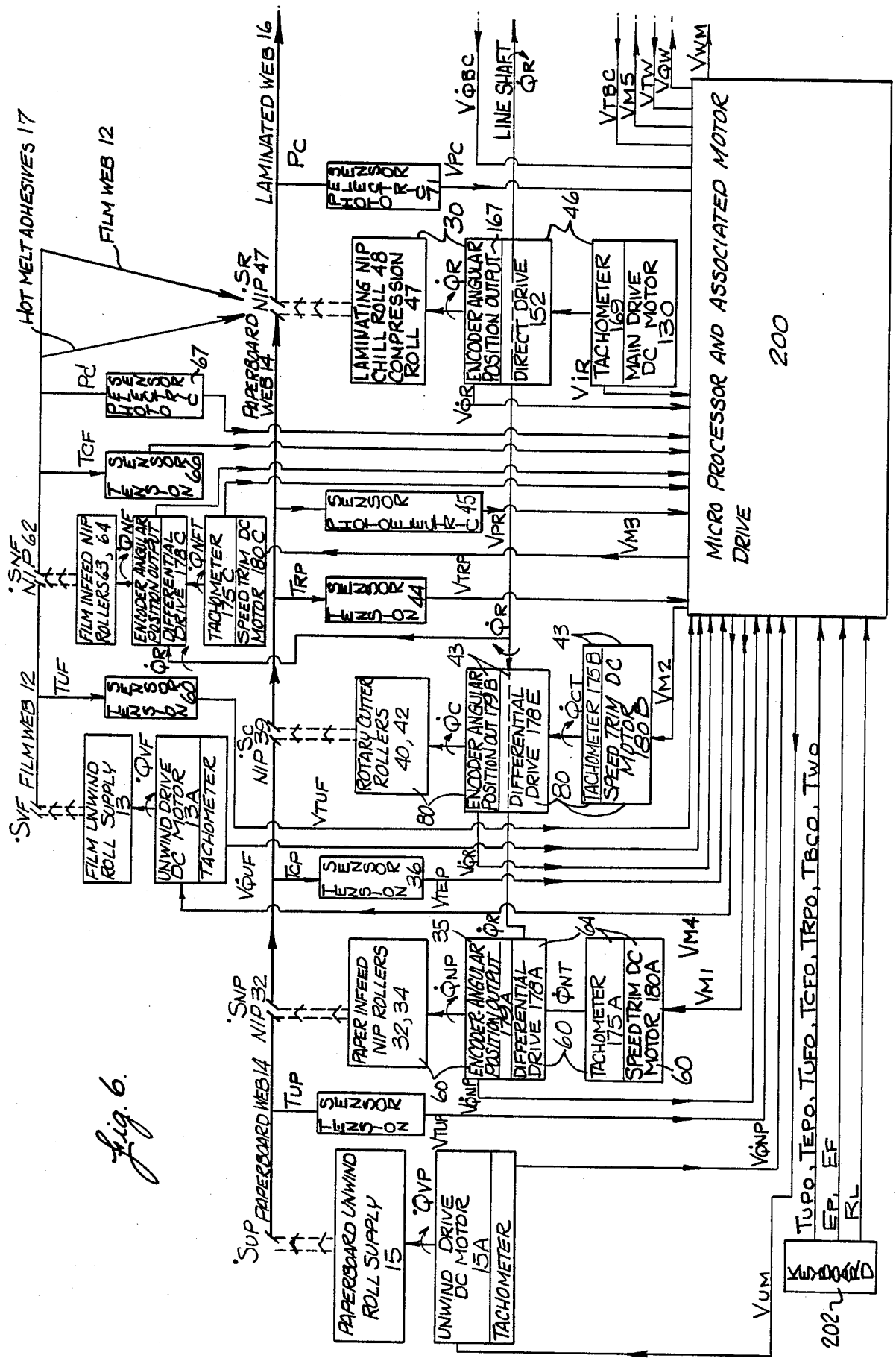

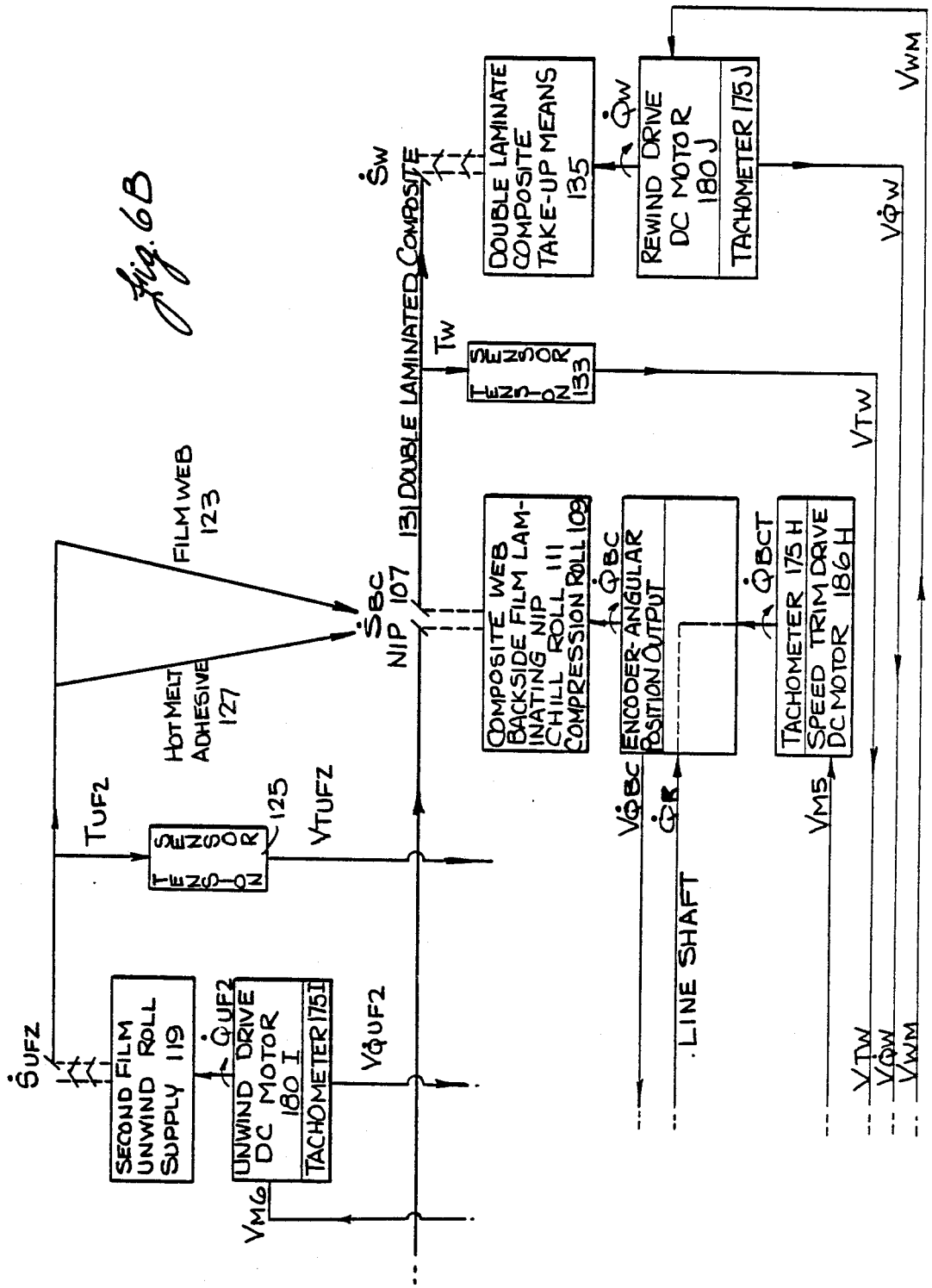

| BLOCK DIAGRAMS | DESCRIPTION |
|---|---|
| r1 →+ ⊗ → e = r1 - c + r2, r2 +, -c | SUMING JUNCTION — ADDITION & SUBTRACTION OF SIGNALS HAVING THE SAME UNITS |
| a ↓, b → [X] → (a)x(b)=c | MULTIPLICATION — VARIBLES "a" & "b" TO FORM "c" |
| R(s) → [G(s)] → C(s) | $C(s) = R(s)\,G(s)$ — THE OUTPUT FUNCTION $C(s)$ IS DIRECTLY DEPENDANT ON THE TRANSFER FUNCTION OF THE COMPONENT $G(s)$ & THE DRIVING FUNCTION $R(s)$ |
| a → [A] → b | SIGNAL OUTPUT "b" IS EQUAL TO THE AMPLIFIED SIGNAL OF THE INPUT ("a") $(A)(a) = b$ |

FIG. 8.

METHOD AND APPARATUS FOR PRODUCING A LAMINATED COMPOSITE MATERIAL HAVING PERFORATED INNER LAYER

The present invention is a continuation-in-part of U.S. Ser. No. 462,917 filed Feb. 1, 1983 for DIE CUT LAMINATING DEVICE of James W. Jensen, now U.S. Pat. No. 4,549,917 issued Oct. 29, 1985, and Ser. No. 751,941 filed July 5, 1985, now abandoned, for DIE CUT WINDOW LAMINATING DEVICE of James W. Jensen, which are both hereby incorporated by reference for all that is disclosed therein.

BACKGROUND AND SUMMARY OF THE INVENTION

The present invention relates generally to the production of container cartons from laminated composite sheet material and more particularly to the production of a film paper laminated composite having a sealed, easily tearable and removable tab portion which may be used to form sealed, liquid-tight cartons with tear out openings.

Lamination of a plastic film material to a paper material has been found to be particularly advantageous where paper products having high strength and abrasion resistant qualities are required. Such laminated composites are particularly desirable in the packaging industry, where artwork may be printed on the interior side of the plastic film to produce a high quality display package. The construction and uee of such laminated composites are described in Peer, U.S. Pat. No. 4,254,173 which is hereby incorporated by reference for all that it discloses.

In producing a laminated composite of the type described in Peer, both the plastic film material and the paper material may be provided in continuous sheets from spools. The paper and the plastic film generally pass over a number of roller type devices where each of the materials are independently stretched out under tension and treated a necessary depending upon the particular end use for the laminated composite. For example the plastic material may be irradiated in conventional processes to increase its strength or improve its printability. In some embodiments the plastic is printed with various graphics and provided with a metalized background over the graphics to enhance the package appearance. The paper may undergo treatment as well such as being electrostatically charged to aid in the bonding process. Either the film material or the paper material or both are treated thereafter with suitable adhesive to provide a bond between the paper and film. To complete the laminating process, the paper and film material are pressed together between opposed rollers to produce a smooth flat composite. Various heating or cooling processes may also be required to ensure proper adhesion of the bonded surfaces, depending on the type of film, paper, add adhesive agent which are being used in such a process. The end product of the process is a laminated composite which may be fed directly to cutting dies or other machines for further processing. The composite may also be collected directly on a separate spool for storage and later processing. Methods for controlling various physical characteristics of the paper web and film web during the lamination process are described in Haake, et al, U.S. Pat. No. 4,572,752; and U.S. patent application Ser. No. 835,234 filed Mar. 3, 1986, now U.S. Pat. No. 4,704,174, for LAMINATING DEVICE WITH PAPER TENSION CONTROL of Roger Allen Thompson et al., which are both hereby incorporated by reference for all that is disclosed therein.

As disclosed in U.S. patent application Ser. No. 517,324, now U.S. Pat. No. 4,691,858 incorporated by reference above, one use of composite material of the type described in Peer, U.S. Pat. No. 4,254,173 is in the production of container cartons such as milk cartons, liquid or powder detergent cartons, dried cereal cartons and other container cartons in which maintaining the container contents in a sealed environment is desirable.

The physical characteristics of composite material, especially composite material having a paper layer sandwiched between a plastic film layer and another moisture barrier layer, are in many ways ideal for container carton construction. The film layer or layers may be extremely thin and yet still function to prevent moisture penetration. The adhesion of the film layer(s) to the paper layer provides a composite material having tear strength and resistance to rupture which is significantly greater than that of conventional paper cartons. Thus composite cartons may be formed using less material than conventional cartons thereby reducing production costs. However, the greater tear resistance of composite cartons may make formation of tear out spouts or other cartons openings relatively difficult. One solution to this problem disclosed in Peer U.S. Pat. No. 4,691,858; incorporated by reference above, is to perforate one layer of plastic film material and a portion of a layer of paper material in a three layer composite having a paper material layer positioned betwee two plastic film layers. A potential problem with this solution is that the carton's ability to prevent liquid penetration may be somewhat compromised through the rupture of one of the nonpermiable plastic layers.

The present invention overcomes this potential problem by providing a method and apparatus for producing a weakened zone in composite material for forming a tear off tab or the like. The weakened zone is formed by perforating the paper layer, and only the paper layer, of a composite material comprising at least one film layer adhered to a paper layer.

Another feature of laminated composite material which makes it desirable for use in container cartons is that an outer film layer may be provided with high quality graphics.

In a high speed laminator of the type described in Haake et al., U.S. Pat. No. 4,572,752, and Thompson et al., U.S. Pat. No. 4,704,174, incorporated by reference above, repeating film graphics patterns are printed on a film web prior to the film web's lamination to a paper web. Ordinarily, the paper web does not contain graphics patterns or other repeating matter which must be placed in registration with the film graphics and thus phasing of the film web to the paper web is not necessary. However, in the method and apparatus of the present invention, a paper web is perforated prior to its lamination to a printed film web, and thus it is necessary to ensure that the perforated portions of the paper web are placed in proper registry with the graphics patterns on the film web. Such registration is complicated by the fact that the film material is relatively extensible and subject to changes in length depending upon operating conditions.

The present invention comprises an apparatus and method for forming a laminated composite having a repeating series of perforated regions in a paper layer which are positioned in registry with a repeating series of graphics patterns on a relatively extensible film layer. The apparatus processes film material and paper material provided in continuous web form to create a continuous web of composite material having such characteristics. The composite material thus formed may be taken up on a composite spool or the like for convenient storage and transportation or may be provided directly to other apparatus for additional process steps leading to the formation of container packages having sealed weakened regions therein which may be ruptured to form an opening for removing the container contents.

The apparatus comprises a paper supply means and a film supply means for supplying a continuous moving web of paper material and a continuous moving web of film material to a laminating means. Prior to entry of the film web and paper web into the laminating means one or both of the surfaces to be bonded is/are coated with an adhesive agent provided by an adhesive supply means. The laminating means apply compressive pressure to the moving paper and film webs by which they are adhesively bonded together to form a moving laminated composite web.

The film material, prior to use in the laminating apparatus, is provided with preprinted (preferably back printed) identical sets of graphics at predetermined spacing intervals hereinafter referred to as repeat length portions of the film web. The repeat length portions are nominally of a constant length but are subject to minor length variations caused by tension changes in the web, ambient temperature change, etc. A predetermined portion of each graphics pattern hereinafter referred to as film "target areas" are designed to be placed in registry with perforated regions of the paper web. Film monitoring means are used to detect the relative position of the film target area with respect to the laminating means. The film monitoring means may comprise photoelectric sensing means for sensing spaced apart printed registration marks on the film.

The paper web prior to entering the laminating means passes through a rotary cutter means which cuts perforated patterns in the paper web at spaced apart intervals. The longitudinal spacing interval of the patterns on the paper web is nominally the same as that of the spacing of target areas on the film web and defines a design repeat length distance.

The present invention provides registry between the target areas on the film web and the patterns on the paper web at the laminating nip by use of a registration means which adjusts the relative position of the perforated pattern "chain" relative the target area "chain" in a phasing mode of operation. "Chain" as used herein will refer to a series of perforated patterns or target areas having equal spacing throughout as opposed to a single perforated pattern or target area. Phasing of the perforated pattern chain with the target area chain is necessary to achieve proper registration at system start up and also to correct out-of-registration conditions caused by discontinuities in the film web such as caused by splicing or by printing errors. Phasing is accomplished through selectively increasing or decreasing the tension in the extensible film web in a selected control portion of the web upstream of the laminating means. The phasing means may comprise a film entry roll means which forms an entry nip which engages the film web upstream of the laminating means. The surface speed of the entry roll means may be selectively varied relative to the surface speed of the laminating roll means whereby the tension in the film web positioned between the laminating cutter roll nip and entry nip may be selectively varied. The tension in the film control portion between the entry nip and the laminating nip is varied relative to a nominal tension provided in an upstream portion of the film web to stretch or shrink a portion of the film web to achieve proper phasing.

A perforated pattern sensing means is provided at a point near the laminating nip whereby the spacing of the perforated patterns relative the laminating nip may be determined. The phasing error between an incoming perforated pattern on the paper web and an incoming target area on the film web is determined by comparison of a signal generated by the pattern sensing means to the film monitoring means signal. This determined phasing error is used to regulate the film entry nip control means whereby the tension in the film control zone is varied for a short duration to place the film target areas in proper registry with the perforated patterns.

In the preferred embodiment the various monitoring means signals and input and output signals from the various control means are processed by an electronic processing means which may comprise a microcomputer.

Due to extensibility of the film web, a further problem associated with registration is encountered. That problem is controlling the length of the individual repeat length portions of the film web to ensure that the lengths of the repeat length portions are within close tolerances of the design repeat length value. The film web repeat length distance is controlled by monitoring the actual repeat length distance of each repeat length portion at a position near the laminating means and comparing the measured value to the design repeat length to determine repeat length error. The repeat length error is corrected by stretching or shrinking the film web. The mechanical apparatus for controlling repeat length may be the same as that used for controlling phasing, however different monitoring and data processing functions are performed to achieve repeat length control. The registration control system thus operates in two different control modes: a phasing control mode and a repeat length control mode, which may both use the same mechanical components. The registration control system changes from one operating mode to another depending upon predetermined criteria such as the absolute value of repeat length error and the ratio of repeat length error to phasing error.

Thus a two-layered laminated composite may be formed having spaced apart weakened regions therein. The composite may be collected on a composite takeup means, for temporary storage or may be fed directly into other processing apparatus. In certain preferred embodiments of the invention, a third layer is added to the two-layered composite by laminating a second film layer to the exposed surface of the paper layer or by coating the exposed surface of the paper layer with a moistue barrier material such as "hot melt" plastic or wax. In another embodiment, the paper web is provided with an exterior plastic barrier layer before its opposite side is laminated to the printed film web. Such three-layered composites have a moisture barrier on each exposed surfaces and may be used to provide carton blanks and, subsequently, cartons which have continuous moisture barriers on both the inside surface and the outside surface. The perforated region in the paper layer of such composites may be configured to provide carton tabs or the like which may be easily ruptured and torn away to provide a carton opening such as a pour spout.

Thus, the present invention may also comprise a carton blank having a perforated tab portion which is formed from a unitary sheet of such a three-layered laminated composite material. At least one laminated plastic layer of the carton blank may be back printed with predetermined carton display graphics.

The present invention may also comprise a carton formed from such a carton blank.

BRIEF DESCRIPTION OF THE DRAWING

An illustrative and presently preferred embodiment of the invention is shown in the accompanying drawing in which:

FIG. 1 is a schematic illustration showing the basic structure and operation of a die cut laminating device;

FIG. 2 is a plan view of a portion of a film web and a portion of a paper web used in a die cut laminating device to form laminated composite;

FIG. 3 is an exploded perspective view illustrating the attachment of a paper web to a film web to form a laminated composite with weakened regions at predetermined positions;

FIG. 4 is a detailed cross sectional view illustrating the perforated portion of the paper web forming the sealed, weakened region in the laminated composite;

FIG. 4A is a detailed cross sectional view illustrating a weakened region of a three layered composite formed by coating the composite of FIG. 4 with a sealing layer of plastic material;

FIG. 4B is a detailed cross sectional view illustrating a weakened region of a three layered composite formed by laminating a second film web to the composite of FIG. 4;

FIG. 5 is a schematic illustration showing the mechanical drive linkage of various moving components of the die cut laminating device of FIG. 1;

FIG. 5A is a schematic illustration showing the mechanical drive linkage of various moving components of the apparatus shown in FIG. 1A;

FIG. 6 is a schematic drawing showing various control means an monitoring means input and output signals used in controlling the die cut laminating device of FIG. 1;

FIG. 6B is a schematic drawing showing various control means and monitoring means input and output signals used in controlling the apparatus of FIG. 1B;

FIG. 8 is a table which defines certain symbols used in FIG. 7;

FIGS. 11A-13A are bottom end views of the carton blanks of FIGS. 11-13 respectively;

DETAILED DESCRIPTION OF THE INVENTION

Figure 1A:
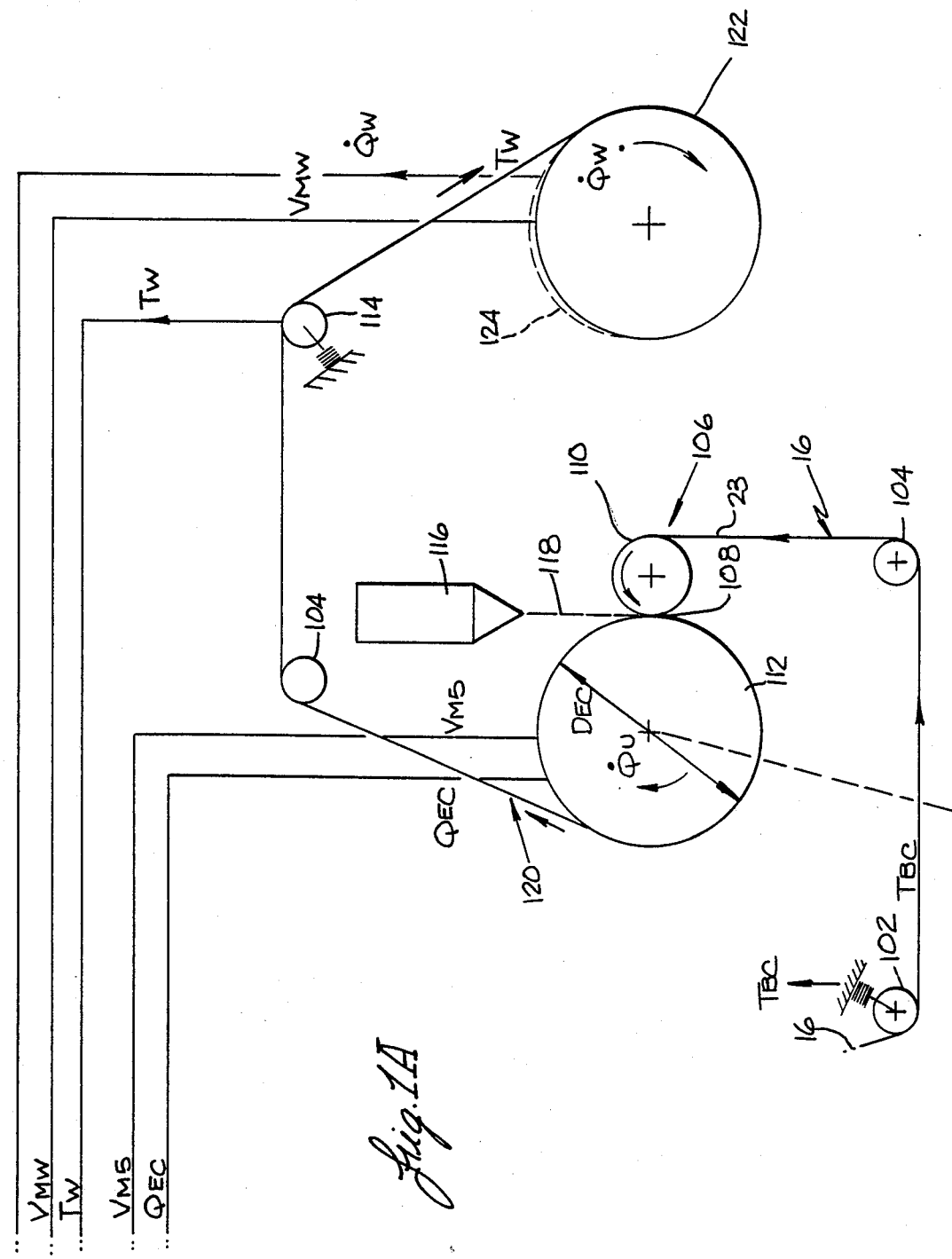
FIG. 1A is a schematic illustration showing the structure and operation of a coating assembly and collection assembly that may be used in association with the laminating device illustrated in FIG. 1.
Figure 1B:
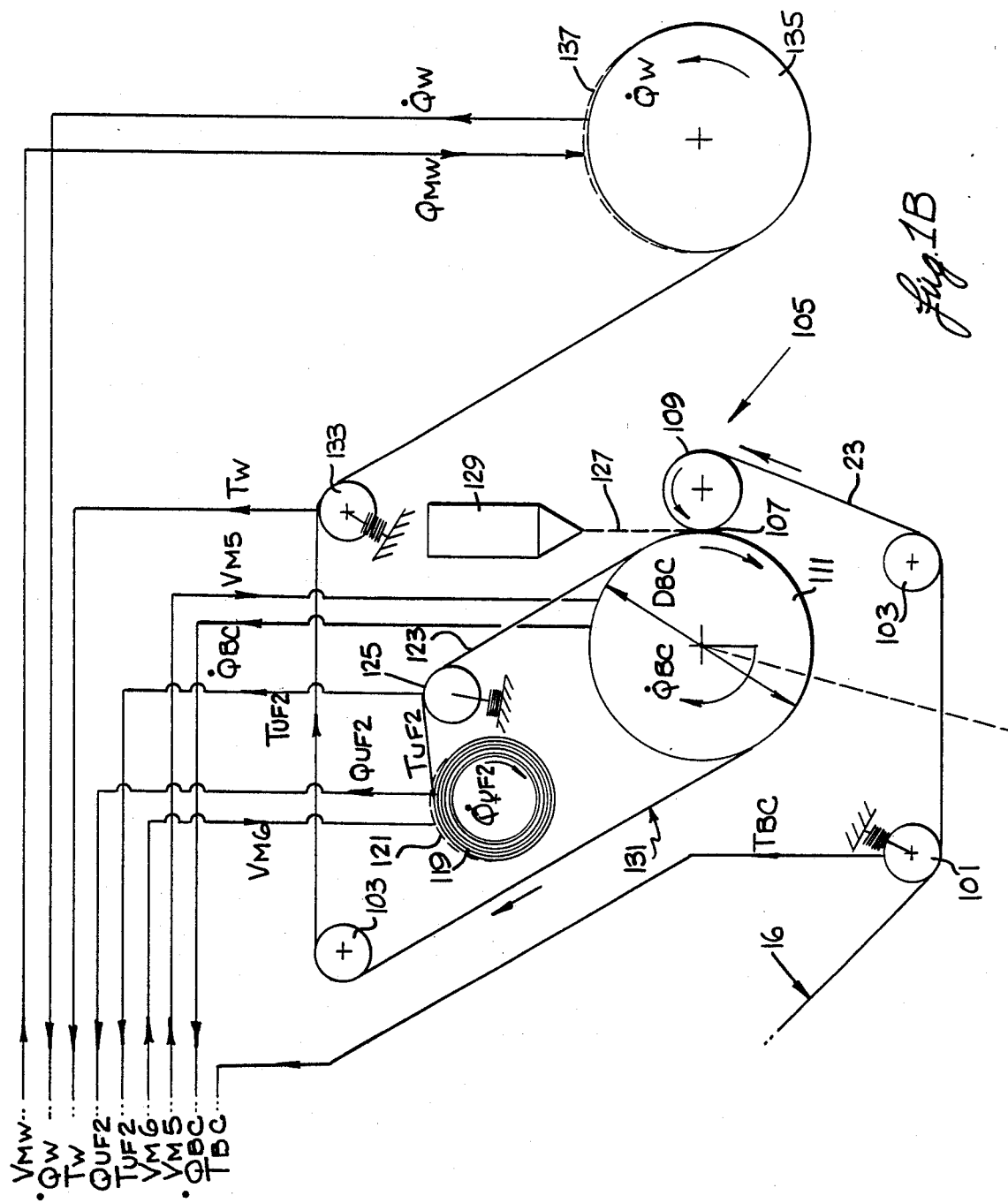
FIG. 1B is a schematic illustration showing the structure and operation of a second laminating assembly and collection assembly that may be used in association with the laminating device illustrated in FIG. 1.

The general layout and control functions of the die cut laminating device 10 of the present invention are illustrated schematically in FIG. 1. A continuous plastic film web 12 is provided from a film supply means such as a film unwind spool 13. For reference herein, the film supply means will define an upstream direction with reference to the film web 12. The film web 12 is provided to a laminating assembly 46. A paper web 14 is supplied from a paper supply means such as a paper unwind spool 15 is also provided to the laminating assembly 46. For reference herein the paper supply means will define the upstream position of the paper web 14. The paper web 14 and film web 12 are bonded together by the use of hot melt adhesive 17 and by pressure applied by the laminating assembly 30 to form a two-layer laminated composite web 16 which is advanced through the device 10. The composite web 16 may be further treated to form a three-layered composite which is ultimately collected on a composite takeup means 122 or 135, FIGS. 1A and 1B.

The film web 12 has an inside surface 20, which may be printed with graphics and the like, and an outside surface 21. Various types of film may be used with the device 10 with varying control requirements, depending largely on the extensibility of the film. In the embodiment of FIG. 1, a relatively extensible, nonoriented film is used. As shown in FIG. 2, the film web 12 is provided with a repeating series of graphics 25, each set of graphics 25 having a nominally constant repeat length 26. A target area 24 having a fixed position within each set of film graphics is adapted to be registered at laminating nip 47 with an associated perforated pattern 28 cut in the paper web as desciibed further below. By "nominally constant repeat length" it is meant that the actual repeat length distance of repeat length portions of the film web may vary somewhat from an "ideal" or "design" repeat length distance which is defined by the interval spccing of perforated patterns 28 on the paper web.

The paper web has an inside surface 22 and a outside surface 23. Many types of paper material including relatively inexpensive paper such as Kraft ® linerboard or recycle folding chip board may be used in the paper web 14 due to the fact that film graphics and metalized covering hide paper flaws and also because the plastic film web provides a significant portion of the tensile strength and tear resistance needed in the composite. Perforated patterns 28, FIG. 2, are cut in the paper web by a cutter assembly 38 positioned upstream of the laminating assembly 46. The perforated patterns are spaced at a constant interval of one design repeat length and are adapted to be registered with the film web target areas.

The two-layered composite 16 formed by the lamination of paper web 14 and film web 12 is illustrated in FIG. 4. The composite comprises a paper layer 14 having a perforated pattern 28 cut therein which is adhered by adhesive 17 to a plastic film layer 12 having a target area 28 positioned in opposite (in registration with) pattern 28 to define a composite weakened zone 29.

A register control system of the present invention is adapted to provide proper registration between the perforated patterns 28 in the paper web and target areas 24 in the paper web, as shown in FIG. 4, through operation in both a repeat length control mode and a phasing control mode.

During operation in the repeat length control mode, the surface velocity of a film entry nip 62 is varied with respect to the surface velocity of laminating nip 47 so as to stretch or shrink the length of each repeat length portion of the film web immediately prior to entering the laminating nip. The amount of film web stretching or shrinking to be produced by this variation between nip velocities is based upon repeat length error determined by monitoring the distance between film web register indicia 19, FIG. 2, and by comparing the measured value to the design repeat length value. Each register indicia 19 is located at an identical position within each repeat length portion. The register indicia spacing is preferably monitored at a position downstream of the laminating nip.

During operation in the phasing mode, the relative velocity between the film entry nip 62 and laminating nip 47 is, again, varied to cause stretching or shrinking of the film web immediately before it enters the laminating nip. However, in the phasing control mode, this stretching or shrinking of the film web is based upon the monitored phasing error between the film web target areas and the paper web perforated patterns. This phasing error is determined by monitoring the passage of perforated patterns and the target areas at locations along the respective webs a short distance upstream of the laminating nip.

In one preferred embodiment of the invention, a stretching or shrinking "bias" or base control signal is initially established in the repeat length control mode. This control bias is thereafter maintained during subsequent phasing control mode and is not changed until the system again returns to a repeat length control mode. A control system decision to shift from one control mode to another may be based upon a ratio of the determined phasing error to the determined repeat length error in combination with a selected repeat length error threshold value. For example, the control system may be programmed to remain in or return to the repeat length control mode whenever the repeat length error exceeds, say, 0.25 inch per repeat length or when the ratio of phasing error to repeat length error is less than, say 0.5. The same system would operate in the phasing mode whenever the absolute repeat length error is less than 0.25 inch per repeat length and when the ratio of phasing error to repeat length error is greater than 0.5.

At a point either upstream or downstream of laminating nip 34, the paper web outer surface 23 may be adhered to a second layer of plastic material, e.g. 126 or 123, FIGS. 4A and 4B. FIG. 1A illustrates the application of a plastic coating layer 126 to surface 23 at coating station 106 positioned downstream from the laminating nip 34. FIG. 1B illustrates the lamination of a second plastic web 123 to paper web surface 23 at a second laminating station positioned downstream of laminating nip 34. The three-layered composite formed by coating paper surface 23 with coating layer 126 is illustrated in FIG. 4A. The three-layered composite formed from laminating a second plastic film web 127 to paper web surface 23 is illustrated in FIG. 4B. The three-layered composite may be collected on a composite collection spool 117 or 122.

Figure 5B:
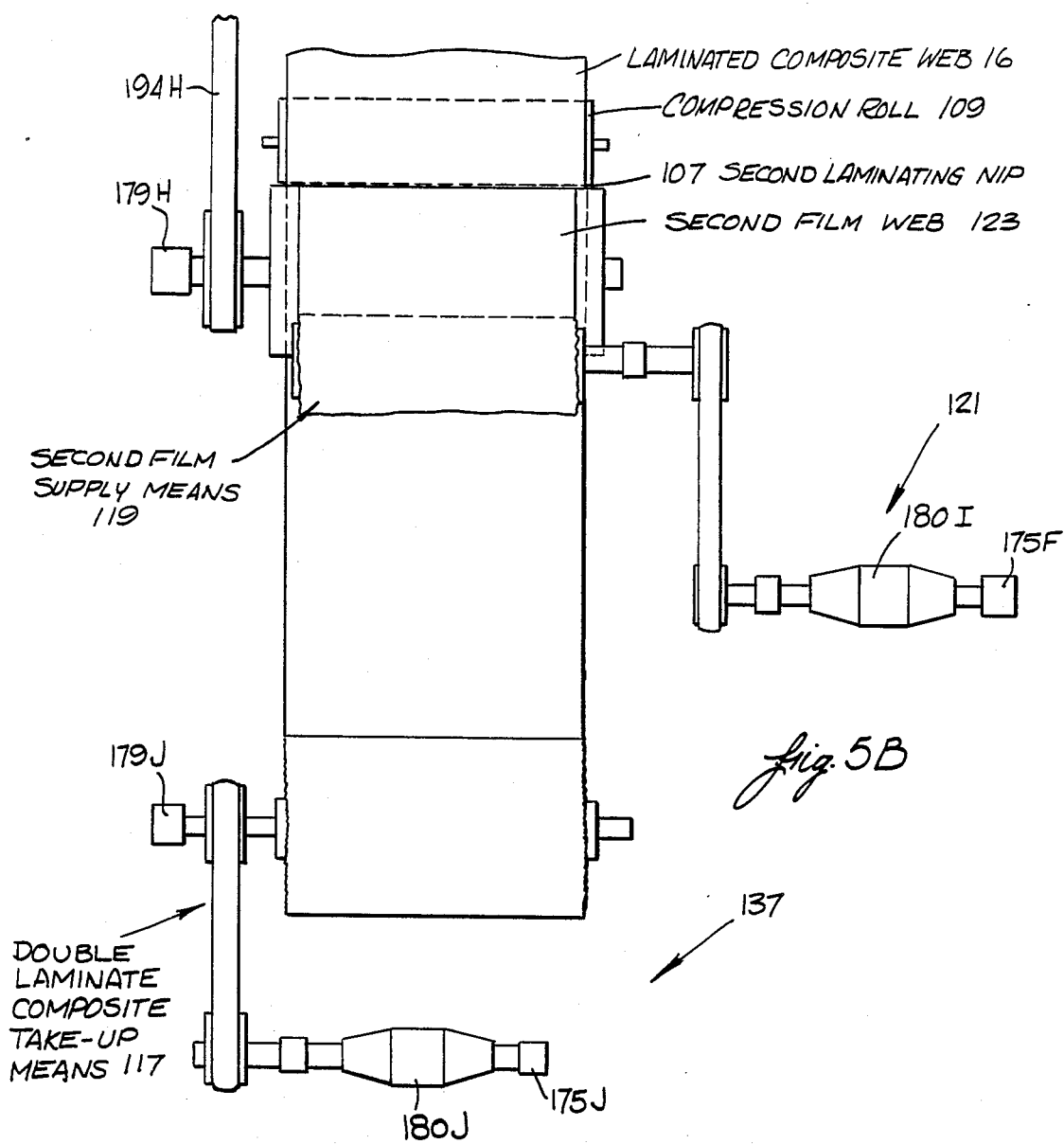
FIG. 5B is a schematic illustration showing the mechanical drive linkage of various mving components of the apparatus shown in FIG. 1B.

Relatively small tension variations in the film web in areas other than the film control region 68 defined by nips 62 and 47 may cause uncontrolled stretching of the film web which increases the difficulty of achieving proper registration between film web target areas and paper web perforated patterns. Similarly, tension variations in the paper web and composite web may cause variations in the velocity of the laminating rolls 31, 34 which interfere with registration. In order to eliminate such tension variations, the various rolls are speed controlled relative the speed of laminating roll 31 through the useoof a data processing means 200 with associated input terminal 20 which generates speed control signals that are used to match the surface speeds of various rolls. Typical mechanical conrol linkages for controlling the speed of various rolls are illustrated in FIGS. 5, 5A, 5B. Having thus described the structure and operation of the apparatus 10 in general, specific features of the apparatus will now be described in further detail.

As illustrated in FIG. 1, the paper web 14 is supplied from a paper unwind spool 15 having a paper unwind speed control assembly 15A. The film web next passes through a paper entry nip assembly 31 having a paper entry nip 32 defined by driven nip roll 31 and idler roll 34. The speed of the paper entry nip assembly is controlled by entry nip speed control assembly 35. After leaving the entry nip, the paper web passes over transducer assembly 36 and one or more idler rolls 37 before entering a rotary cutter assembly 38. The cutter assembly comprises a cutter nip 39 defined by a cutter roll 40 and a cutter backing roll 42. The cutter roll has a raised cutting die 41 thereon adapted for cutting perforated patterns in the paper web. The circumference of the cutter roll 40 is equal to one design repeat length whereby the perforated patterns cut in the paper web are positioned at one design repeat length intervals. After leaving the cutter nip, the paper web passes over another tension transducer assembly 44 and various idler rolls 37. A photo eye assembly 45 is positioned so as to sense the passage of perforated patterns 28 in the paper web and thus provides a perforated pattern monitoring means. The photo eye assembly may be any of a number of commercially available photoelectric scanning assemblies. The photo eye assembly 45 is positioned at a predetermined distance $l_R$ upstream of a laminating nip 47. The paper web next enters laminating assembly 46 having a laminating nip 47 defined by a driven chill roll 48 sometimes referred to herein as a main laminating roll, and compression roll 49. Immediately prior to entering the laminating nip 47, the paper web is coated over the entire surface area thereof with a hot melt adhesive 17 supplied by an extruder assembly 52 positioned immediately above the laminating nip.

Back printed plastic film web 12 is supplied from a film unwind spool 13 equipped with a speed control assembly 13A. After leaving the unwind spool, the film web passes over a tension transducer assembly 60 and various idler rolls 37 before entering a film web entry nip assembly 61. The entry nip assembly 61 may comprise an entry nip 62 defined by first and second driven pinch rolls 63, 64. Other tension isolation means such as S-wrap rolls might also be used in place of pinch rolls. The speed of the pinch rolls 63, 64 are controlled by an entry nip speed control assembly 65. After leaving the entry nip, the film web passes over another transducer assembly 66 and various idler rolls 37. At a distance $l_C$ upstream of laminating nip 47, the film web passes below a photo eye assembly 67 which senses the passage of film target areas 24 passing below it and thus comprises a target area monitoring means. Photo eye assembly 67 may operate by sensing the passage of register indicia 19 which are positioned at a predetermined distance from the film web target areas whereby the position of the target areas may be readily determined from the detection of the register indicia 19. The film web is also coated by hot melt adhesive 17 supplied from extruder assembly 52 immediately prior to entering the laminating nip 47. Nips 62 and 47 define a film web stretch control region 68. In the laminating nip 47, the film web and paper web are subjected to even pressure which causes the formation of a smooth, flat, two-layered laminated composite 16. The laminated composite 16, which was initially heated by the hot melt adhesive 17, is cooled through contact with the chill roll 48. The composite web 16 leaves the chill roll and passes over a take-off idler roll 70. A third photo eye assembly 71 is positioned a short distance downstream of the chill roll 48 and monitors the passage of register indicia 19 on the film web for determining the actual length of each repeat length portion 25 of the film web subsequent to lamination.

The two-layered composite 16, after leaving the laminating assembly 46, passes over a tension transducer 101 or 102 and may thereafter be immediately collected on a composite takeup spool such as that described below with reference with FIGS. 1A or 1B. In other embodiments of the invention, the two-layered composite web 16 is further treated to provide a plastic layer over the exposed surface 23 of the paper layer. Apparatus for providing this addition film layer will now be described with reference to FIGS. 1A and 1B.

The apparatus illustrated in FIG. 1A may be a further portion of the apparatus illustrated in FIG. 1. As shown in FIG. 1A, the film composite web 16, after passing over transducer assembly 102, may pass over further idler rolls 104 before entering cating assembly 106. The coating assembly comprises a coating nip 108 defined by a compression roll 110 and a chill roll 112. A coater extruder assembly 116 applies an extrusion coating material 118 to exposed surface 23 of the paperboard portion of the composite web 16 immediately prior to entry of the web 16 into the coating nip 108. Chill roll 112 cools the coating material through surface contact to provide a three-layered composite 120, as shown in FIG. 4A. The three-layered composite web thereafter passes over various idler rolls 104 and a tension transducer assembly 114 prior to being wound on a composite takeup roll assembly 122. The speed of the takeup roll assembly 122 is controlled by a speed control assembly 124.

In the embodiment of the invention illustrated in FIG. 1B, a second film web is laminated to the exposed paper surface 23 of the two-layered comoosite 16. In this embodiment, the two-layered composite web 16, after leaving the first laminating assembly 46, passes over a tension transducer 101 and various idler rolls 103 prior to entering a second laminating nip 105 having a laminating nip 107 defined by a compression roll 109 and a chill roll 111. A second film web supply roll assembly 119, which is controlled by speed control assembly 121, provides a second film web 123 which passes over a tension transducer assembly 125 prior to entering second laminating nip 107. Both the exposed paper surface 23 and one surface of second film web 123 are coated with adhesive extrusion 127 immediately prior to entering the laminating nip 107. Thereafter, contact with ciill roll 111 cools the web to provide a three-layered composite 131, as shown in FIG. 4B. The composite web 131 may pass over various idler rolls 103 and transducer assembly 333 prior to being received on composite takeup spool 135, the speed of which is controlled by speed control assembly 137.

As shown in FIGS. 1, 1A, and 1B, signals indicative of the surface speed of each unwind roll, collection roll, and the various nips are provided to a data processor 200. Tension values between adjacent nips or between nips and supply or collection spools are also provided to the data processor. A perforated pattern detection signal and two different register indicia detection signals are provided to the data processor 200 by photo eye assemblies 45, 67, and 71, respectively. The data processor 200 processes these signals and provides speed control signals to the various speed control assemblies of the supply spools, collection spools, and various nip speed control assemblies in order to achieve registration between the perforated patterns on the paper web and the film target areas at laminating nip 47, and to maintain relatively constant tension in the paper web 14 and composite webs 16 and 120 or 131 throughout the web forming process. In order to achieve registration between the perforated patterns of the paper web and the film web target areas, the control system of the present invention operates in a phasing control mode and also in a repeat length control mode. In the phasing control mode, a phasing error between an incoming paper web perforated pattern and an incoming film web target area is measured by measuring the web travel distance occurring between the sensing of a perforated pattern at sensor 45 and the sensing of film target area at sensor 67 such as by counting encoder pulses from an encoder such as chill roll encoder 169 which occur between detection signal pulses. The distances $l_R$ and $l_C$ are preferably selected such that, if a perforated pattern and a target area are in phase, the signals from photo eye assemblies 45 and 67 will be simultaneous. When a phasing error is detected, the film web portion between the laminating nip 47 and the film web entry nip 62 is relatively stretched or shrunk by varying the tension in that web portion. This tension variation is achieved by controlling the surface speed of film web nip assembly 61 with respect to the relatively constant surface speed of laminating nip assembly 46. This speed adjustment takes place during a relatively short period of time to cause a relative upstream or downstream movement of the film web target area chain with respect to the paper web perforated pattern chain. After the phasing is completed, the film web entry nip 61 returns to a base operating speed which was determined by the system in the immediately preceding repeat length control mode. In a repeat length control mode, the repeat length distance of each repeat length portion 26 of the film web is measured by measuring the distance of web travel occurring between the photo eye assembly 71 detection pulses, e.g. by counting encoder 169 pulse occurring between detection signal pulses. The measured repeat length distance of a repeat length portion is thereafter compared to the design repeat length value. If the measured repeat length varies from the design repeat length, then the film web between the laminating nip 47 and the film web entry nip 62 is either stretched or shrunk to achieve the prope repeat length value. Phasing errors which are corrected in the phasing mode are generally produced by a distortion in a relatively short length portion of a film web, e.g. a phasing error may be caused by a splice which substantially shortens the length of one repeat length portion of the film web. Thus, phasing errors are generally correctable by a short duration velocity change of the entry nip 61. Repeat length errors, on the other hand, tend to affect much larger portions of the film web. For example, repeat length errors may be caused by the fact that the entire film web has been relatively shrunk due to a decreased ambient temperature in the production facility. Repeat length errors which occur in such large length portions of the film web or over the entire film web thus require a continuous operation of the film web entry nip at a speed above or below the surface speed of the laminating nip 46 in order to provide a continuous stretching or shrinking of the film web prior to its entry into the laminating nip 47. An uncorrected repeat length error in itself would of course produce phasing errors of a constantly growing magnitude if undifferentiated from ordinary phasing-type errors. In order to differentiate phasing-type errors from repeat length errors, the data processing unit continuously compares measured phasing errors to measured repeat length errors and, based upon this comparison, either operates in a phasing control mode or a repeat length control mode. The exact criteria for determining when to shift from a repeat length control mode to a phasing control mode will depend upon characteristics of the various webs such as the design repeat length, the elastic limit of the film web, and control response characteristics of the system. Due to the continuous nature of repeat length errors, a base line entry nip velocity determined in a repeat length mode will continue to be used as a base velocity in a subsequent phasing control mode. For example, if in a previous repeat length control mode, it is determined that the operating speed of the film web entry nip 61 must be 5% less than the surface speed of the laminating assembly 46, this same reduced entry nip operating speed used to achieve repeat length correction will be used as a base speed in the subsequent phasing control mode, i.e. the relative increase or decrease of speed of the entry nip assembly 61 will be above or below the speed determined in the previous repeat length operating mode and will be of a relatively short duration, after which the speed of nip assembly 61 will return to a speed of 5% less than the laminating assembly 46.

The arrangement and operation of the various control system components will now be described in detail.

Preferred embodiments of the mechanica linkage of the laminating device 10 are illuttrated schematically in FIGS. 5, 5A, and 5B. A main drive means such as main drive motor 150 is operably connected to a main gear box 152 which in turn drives main drive shaft 154. Main drive shaft pulley 156 mounted on shaft 154 is connected by means of drive belt 158 to a secondary drive shaft pulley 162 coaxially mounted on secondary drive shaft 160 with pulley 164. Pulley 164 is operably connected to chill roll pulley 16 by another belt 166 whereby the chill roll 48 is rotated about chill roll drive shaft 170 which is operably mounted with tachometer/encoder 169 for sensing the speed of the chill roll 48. Paper entry rolls 33, 34 forming nip 32 are mechanically linked to first phase drive unit 171A and main drive motor 150 as by main drive shaft parasite pulley 172A operably connected by belt 173A to phase drive pulley 174A, in turn mounted on phase drive shaft 176A. Phase drive shaft 176A is operably connected by conventional means well known in the art to a differential unit 178A, such as for example A. Fischer, Inc., Model No. G400, having a phase drive correction pulley 184A. Phase drive correction pulley 184A is operably connected by means of a drive belt 186A to conversion pulley 188A mounted on conversion drive shaft 190 upon which infeed roll connector pulley 192A is coaxially mounted. Infeed roll belt 194A is operably connected to infeed roll pulley 196A.

Mechanical input to differential unit 178A is provided by correction trim motor 180A for the purpose of increasing or decreasing the rotation speed of phase drive correction pulley 184A. The correction motor rotational input is added or subtracted from the speed of shaft 176A by an internal differential gearing mechanism (not shown) of a type well known in the mechanical arts. Correction trim motor 180A is actuated and controlled by correction motor control circuitry which in turn receives commands as through electrical cables (not shown) from data processing unit 200 as discussed in further detail herein.

The cutter roll 40 is connected with a second phase drive unit 171B and associated linkage which may be similar or identical in connection and operation as that described above for the infeed roll 61. Thus the entry nip control means 64, and the rotary cutter control means 33 may comprise first phase drive unit 111A and a second phase drive unit 171B respectively.

Figure 6A:
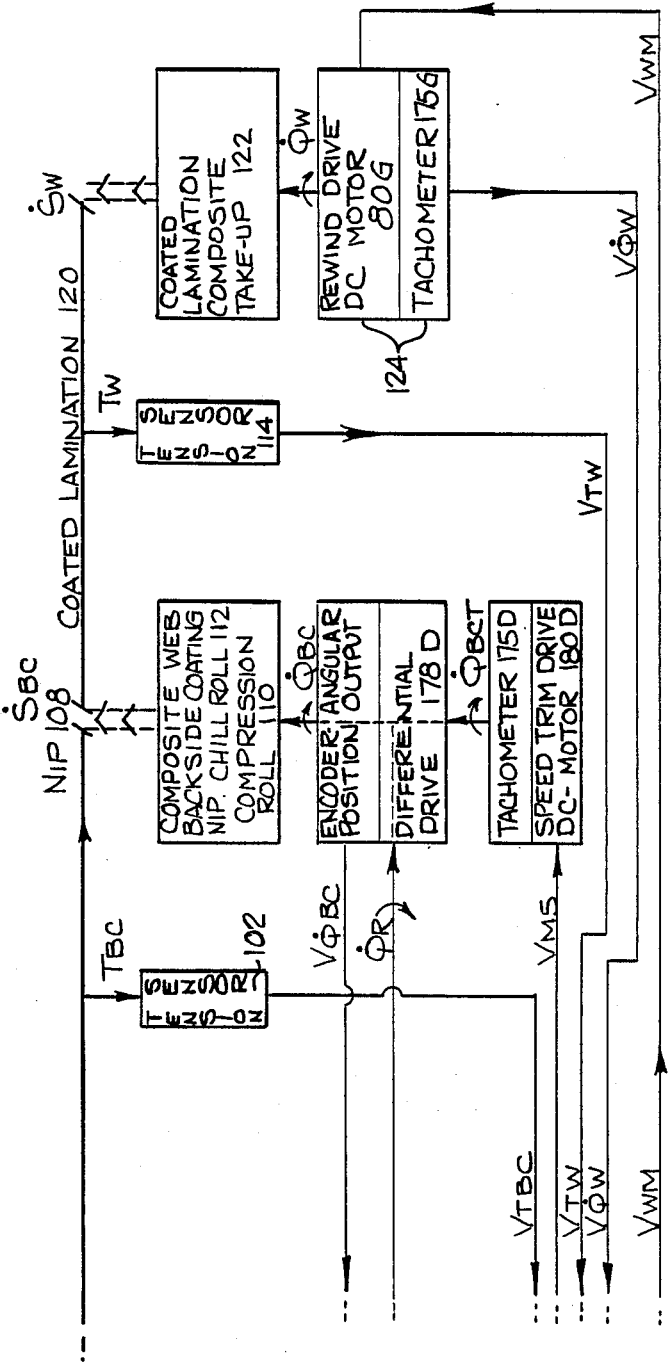
FIG. 6A is a schematic drawing showing various control means and monitoring means input and output signals used in controlling the apparatus of FIG. 1A.

As illustated in FIGS. 1, 5 and 6, the angular speed of each trim motor 180A, 180B is monitored by an associated tachometer device 175A, 175B which feeds back a negative direct current voltage signal corresponding to its associated trim motor rate. The processing means 200 sums a positive direct current voltage with the tachometer signal. A signal generated by the sum of these two values controls the associated trim motor, driving it at a "null" speed. The trim motor null speed is the speed necessary to provide the proper angular speed in the associated rolls for proper web phasing.

An encoder device 179A, 179B is associated with each set of rolls as by mounting on the shaft of infeed roll 33 and cutter roll 41, respectively. Each encoder device produces a series of shaft speed dependent electrical pulses which may be processed by the processing unit 200 to obtain the angular speed and position of an associated shaft. These values may in turn be used by the processing unit 200 to generate the signal which is added to an associated tachometer signal to control the speed of an associated trim motor as discussed above. A traditional tachometer resolver combination might of course also be used to obtain angular rate and position of the various shafts.

Speed control of other nips in the apparatus 10 with respect to laminating nip 47 may be achieved through the use of similar or identical components to those used for controlling the paper entry nip and the cutter nip assembly Such components are shown in FIGS. 5, 5A, and 5B and are identified by series "C" numerals in association with the film entry nip assembly 61; series "D" numerals in association with the coating assembly 106; and series "H" numerals in association with the second laminating assembly 105. Control of the various supply rolls and collection rolls are achieved through direct electronic control of an associated drive motor with necessary feedback signals to the data processing unit provided by an encoder unit on the unwind or collection roll and by a drive motor tachometer. The paper web supply roll spedd control assembly thus comprises drive motor 180E, motor tachometer 175E, and supply roll encoder 179E. Other identical speed control assemblies are shown and designated by "F" series numerals for first film supply roll speed control assembly 13A; "G" series numerals for coated lamination collection roll speed control assembly 124; "I" series numerals for second film web supply roll speed control assembly 121; and "J" series numerals for double laminated composite collection roll speed control assembly 137.

Other phase drive units might also be used in place of those illustrate herein. For example, a "phase lock loop" control means might be used. In this type of system for example the paper entry nip rolls and the cutter roll would be electronically "locked" in proper speed and position relationship. This method of implementation requires the use of indppendent motors such as described for the collection and unwind rolls which are associated with each set of nip rolls being controlled, in addition to the chill roll drive motor 150. Digital speed and position indicators would be provided to interface each pair of shafts (chill roll, infeed roll, cutter roll, etc.) in various combinations and would allow the "slave" shaft to be controlled as to speed and position related to an associated "master" shaft. In this method of implementation the need for differential drive units connected to a master shaft would be eliminated.

The control systems of the device 10 are shown by FIGS. 1, 1A, 1B, 6, 6A, 6B, 7 and 8. Reference letters used in these Figures refer to quantities as tabulated in Table I below.

TABLE I

| Symbol | Unit | Description |
|---|---|---|
| $T_U$ | lbs | Paper unwind tension |
| $T_C$ | lbs | Paper control tension = paper tension into cutter nip 81 (controls window/pattern registry) |
| $T_R$ | lbs | Paper reference tension = paper tension into laminating nip 34 |
| $T_W$ | lbs | Laminate winding tension |
| $Q_{NP,F}$ | Rad/sec | Infeed nip roll angular rate; subscript "P" is paper and "F" is film |
| $\dot{Q}_C$ | Rad/sec | Rotary cutter roll 82 angular rate. |
| $\dot{Q}_R$ | Rad/sec | Chill roll 31 angular rate (used as the reference rate signal) |
| $D_{NP,F}$ | inches | Diameter of infeed nip roll; subscript "P" is paper and "F" is film |
| $D_C$ | inches | Diameter of cutter roll 82 |
| $D_R$ | inches | Diameter of chill roll 31 |
| $P_R$ | seconds | Photoelectric sensor 52 sampling period with value dependent on film web line seed with a discreet signal indicating film web reference mark presence |
| $P_C$ | seconds | Photoelectric sensor 94 sampling period with value dependent on paper web line speed with a discreet signal indicating paper window pattern presence |
| $E_{P,F}$ | lb/in² | Web stiffness or Youngs modulus; subscript "P" is paperboard, subscript "F" is film |
| $\dot{Q}_{C1}$ | rad/sec | Trim motor 180A angular rate, controlling infeed nip roll 61 speed |
| $\dot{Q}_{C2}$ | rad/sec | Trim motor 180B angular rate controlling rotary cutter 82 speed |
| $\dot{S}_{N,P}$ | in/sec | Infeed roll 61 surface speed |
| $\dot{S}_R$ | in/sec | Surface speed of chill roll 31 (reference speed) |
| $\dot{S}_C$ | in/sec | Rotary cutter 82 surface speed |
| $V_{Q2}$ | volts | DC voltage pulse train from the absolute encoder 179B indicating angular position of cutter roll 82 |
| $\dot{S}_W$ | $L_{RL}$/sec | Web surface speed into laminating nip measured in repeat lengths |
| $C_R$ | in/sec | Paper window pattern register correction rate |
| $C$ | inches | correction of paper window pattern register |
| $L_X$ | inches | Initial paper window pattern register error |
| $K_{PU,O}$ | lbs/in/sec | Paper relationship between draw and tension (subscript "u" increasing, "d" decreasing tension) |
| $W_{U,O}$ | rad/sec | Paper recovery break frequency ("u" increasing, "d" decreasing tension) |
| $K_{TR}$ | volts/lb | Tension transducer static gain |
| $W_3$ | rad/sec | Tension transducer break freqency |
| $V_{TR,C}$ | volts | Tension transducer output voltage subscripts "R" and "C" denote reference and control |
| $V_M$ | volts | Microprocessor D to A voltage for trim motor speed adjust "1" and "2" indicate 1st and 2nd Motors - 180A and 180B, etc. |
| $V_N$ | volts | Microprocessor bias voltage for trim motors set to achieve nominal tensions |
| $K_T$ | ft-lb/amp | Trim motor torque constant |
| $R_A$ | ohms | Trim motor armature resistance |
| $K_{FB}$ | volts | Trim motor tachometer feedback voltage |
| $J_M$ | slugs | Effective trim motor inertia |
| $K_1$ | unitless | Sheave ratio from differential output shaft through infeed nip roll |
| $K_2$ | unitless | Sheave ratio from differential output shaft through rotary cutter |
| $K_3$ | unitless | Sheave ration between laminating chill roll through the rotary cutter differential |
| $S$ | 1/sec | Laplace operator indicates (d/dt) |
| $l_C$ | inches | Film web distance between photoelectric sensor (52) and laminating nip 34 = reference distance |
| $l_R$ | inches | Web distance between optical sensor and laminating nip 34 = control distance |
| $K_4$ | unitless | Sheave ration between laminating chill roll through the print cyliner differential |
| $K_5$ | unitless | Sheave ration from differential output shaft through the print cylinder |
| $K_6$ | unitless | Gear ration from trim motor shaft through the associated differential output, subscripts 1 and 2 apply to the respective motors |
| $L_{RL}$ | inches | Repeat length of printed image |
| $L_W$ | inches | Web width |

TABLE I-continued

| Symbol | Unit | Description |
|---|---|---|
| t | inches | Web thickness |

The meanings of various block diagram symbols are illustrated in FIG. 8. The input to microprocessor 200 and associated motor drive electronics of the various displacement, speed and acceleration values of various moving components of the device 10 and web materials moving therethrough as well as other control values relating to physical dimensions and characteristics of the devices 10 and web materials are illustrated schematically by FIG. 6.

Figure 7:
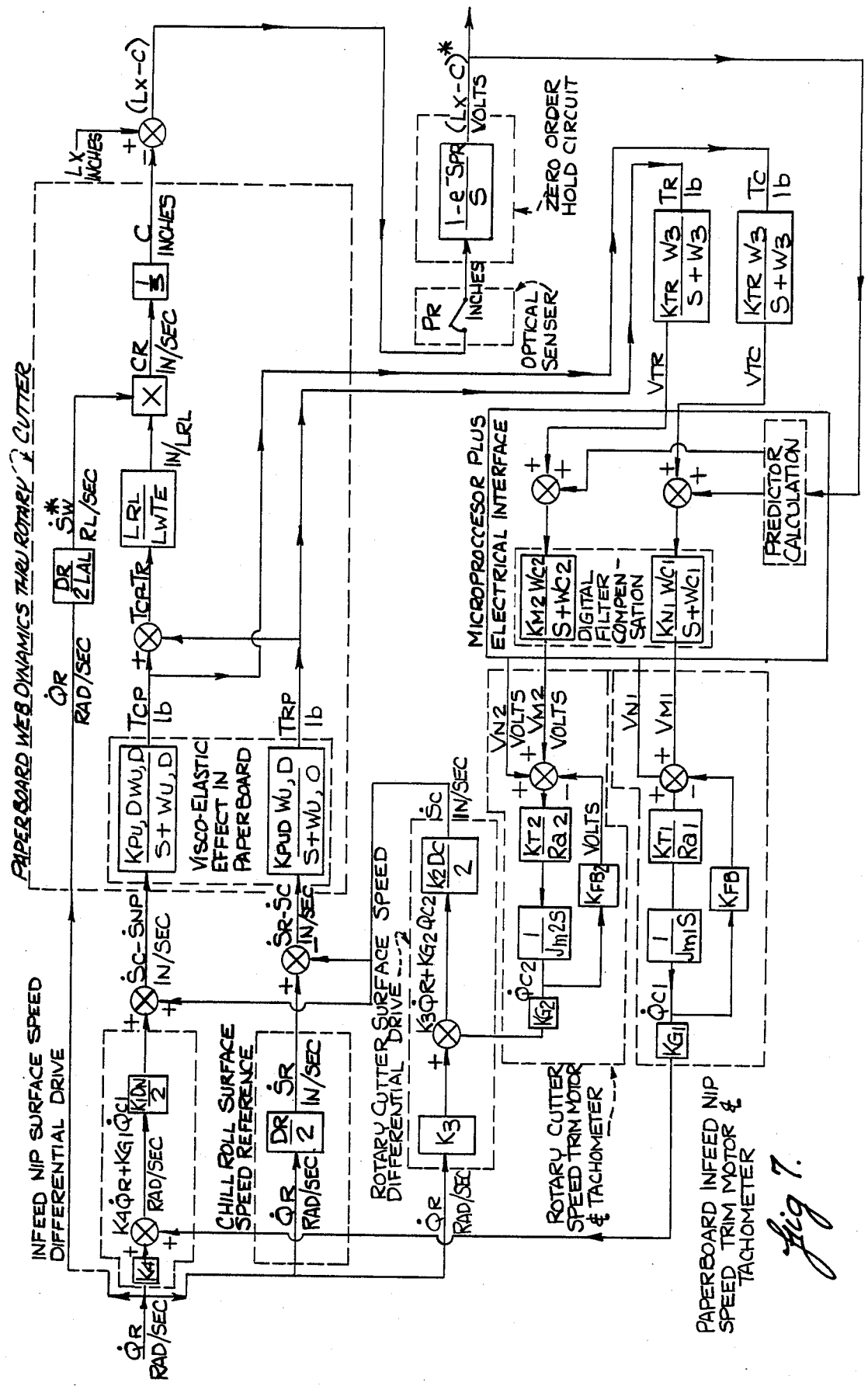
FIG. 7 is a control logic diagram for a registration control system of a die cut laminating device.

Control logic for registration control is illustrated in FIG. 7. The use and construction of appropriate software and circuitry for implementing the described registration control will be readily apparent to those skilled in the art from the control parameter, diagram of FIG. 6, control function diagram of FIG. 7 and the explanation of symbols found in Table I and FIG. 8.

In one preferred embodiment of the invention certain components used in the device 10 may be as indicated in Table II below.

TABLE II

| No. | Component | Supplier & General Description |
|---|---|---|
| 38 | Rotary Cutter | Magna-Graphics, Inc. Industrial Park P.O. Box 987 Oconto Falls, WI 54154 -OR- Aurther J. Evers Co. 1009 Broad St. Riverton, NJ 08077 |
| 200 | Microprocessor | Texas Instruments, TI 520 Industrial Controls, MS 3516 Johnson City, TN 37605-1255 |
| 36, 90, etc. | Tension Sensors | Magpowr; Magnetic Power Systems, Inc. T5-500 1626 Manufacturers Dr. Fenton, MO 63026 |
| 45 | Photoelectric Sensor | Scanning Devices, Inc. 3-1 226 Broadway Cambridge, MA 02139 |
| 67, 71 | Photoelectric Sensor | Scanning Devices, Inc. S-ILED 226 Broadway Cambridge, MA 02139 |
| 178 A,B,C, etc. | Differential Drives | Conic Systems, Conac 25 220 Fairfield Road Fairfield, NJ |
| 169 | Tachometer | Reliance Electric, 5BC 46AB 24703 Euclid Avenue Cleveland, Oh 44117 |
| 175 A,B,C | Tachometer | Reliance Electric, 5BC 46AB 24703 Euclid Avenue Cleveland, Oh 44117 |
| 31, 61 | Infeed Nip Roller Assembly | Magna-Graphics, Inc. Industrial Park P.O. Box 987 Oconto Falls, WI 54154 |

Figure 13:
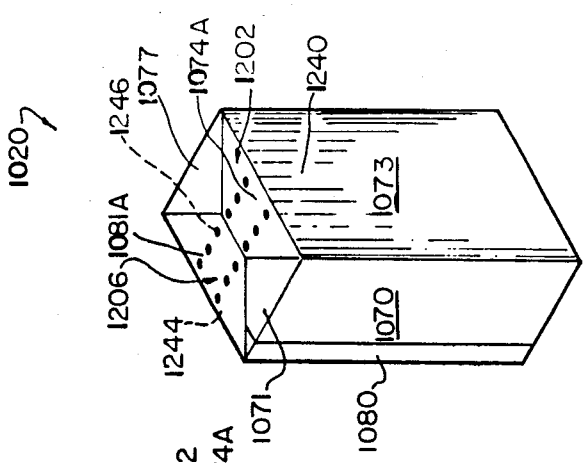
FIGS. 10-13 are perspective views illustrating folding and sealing sequences for forming a carton from a carton blank.
Figure 13A:
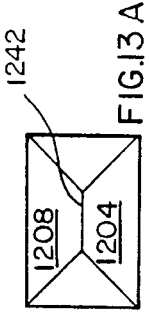

The disclosed apparatus may be used to produce a laminated composite which is used to produce a unique carton blank. Thus, the present invention also comprises a carton blank 1010, FIG. 9, which may be folded and sealed to produce a container 1020 for milk or the like having a right regular parallelepiped shape or, more colloquially, a rectangular box-like shape as illustrated by FIG. 13. The carton blank 1010 and carton 1020 formed therefrom may be formed from a two-layered composite as illustrated in FIGS. 3 and 4 or may be formed from a three-layered composite as illustrated in FIGS. 4A and 4B.

Figure 9:
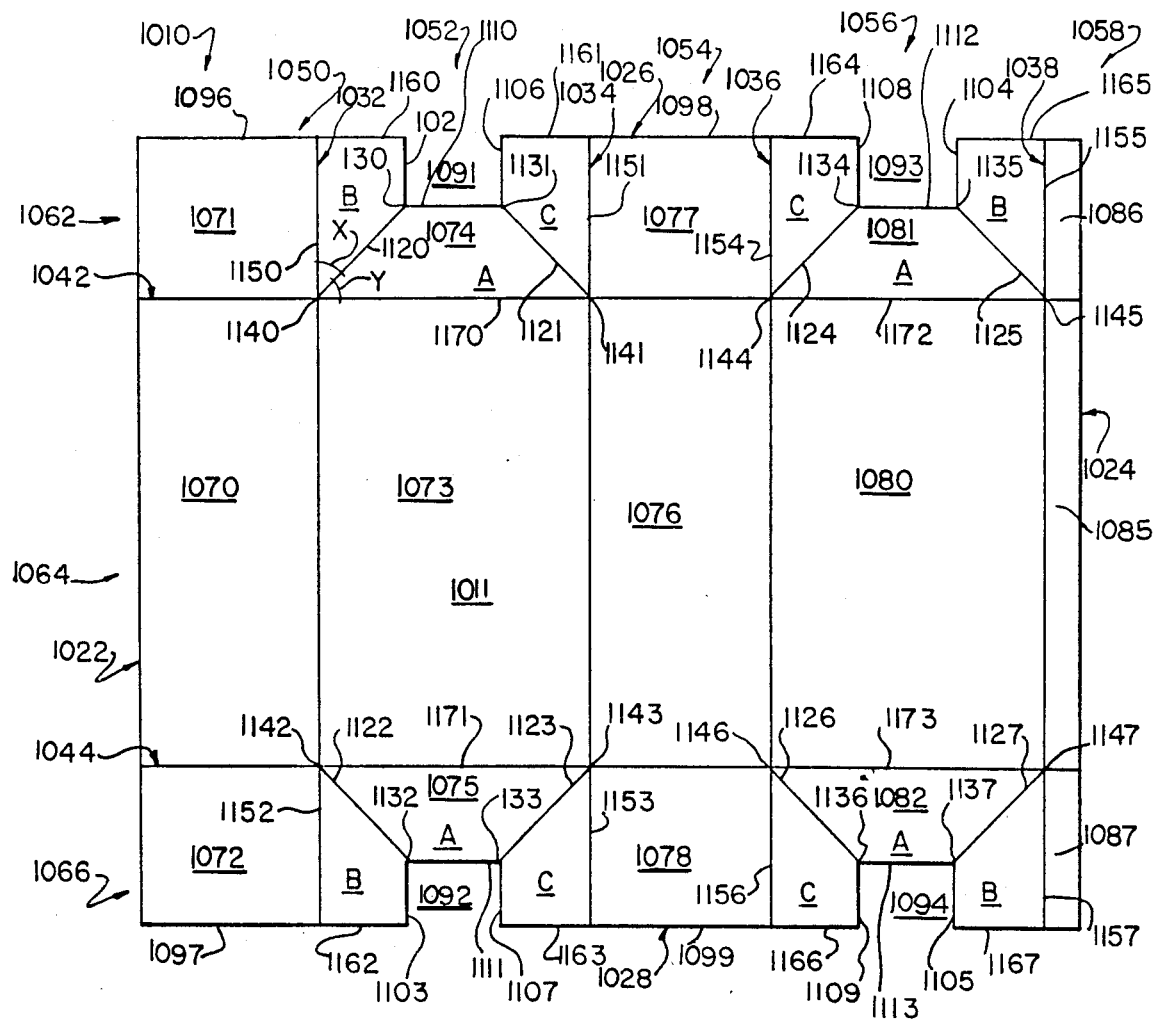
FIG. 9 is a plan view of a carton blank of the present invention.

FIG. 9 illustrates the carton blank 1010 of the present invention viewed from the surface which becomes the exterior surface of the carton 1020 after the folding and sealing operations have been performed. The carton comprises four peripheral edge surfaces including a left side edge 1022, a right side edge 1024, a top edge 1026, and a bottom edge 1028. Edges 1022 and 1024 are perpendicular to edges 1026 and 1028 defining a rectangle. The designations of left, right, top and bottom are arbitrary and are used herein only for purposes of reference.

First, second, third and fourth longitudinal fold lines 1032, 1034, 1036, 1038 are provided running from top edge 1026 to bottom edge 1028 in perpendicular relationship thereto. Upper and lower transverse fold lines 1042, 1044 are provided extending from side edge 1022 to side edge 1024 in perpendicular relationship thereto. The fold lines may be provided by conventional creasing methods and apparatus well known in the art. The longitudinal fold lines divide the carton into first, second, third, fourth and fifth longitudinal portions 1050, 1052, 1054, 1056, 1058. The first longitudinal portion 1050 is identical in width to the third longitudinal portion 54 and the second longitudinal portion 1052 is identical in width to the fourth longitudinal portion 1056. The fifth longitudinal portion 1058 is substantially narrower than the other longitudinal portions. The transverse fold lines 1042, 1044 divide the carton into upper, middle and lower transverse portions 1062, 1064, 1066. Opposite portions of upper and lower transverse portions 1062, 1066 have identical lengths, the length of portions 1062, 1066 being substantially shorter than the length of middle transverse portion 1064. As used herein, "length" refers to a dimension extending parallel the longitudinal fold lines and "width" refers to a dimension extending perpendicular to the longitudinal fold lines.

The grid formed by the longitudinal and transverse fold lines divide the carton into left lateral side panel 1070, left top panel 1071, left bottom panel 1072, front lateral side panel 1073, front top panel 1074, front bottom panel 1075, right lateral side panel 1076, right top panel 1077, right bottom panel 1078, back lateral side panel 1080, back top panel 1081, back bottom panel 1082, edge flap lateral side panel 1085, edge flap top panel 1086, and edge flap bottom panel 1087. Panels 1071, 1072, 1077 and 1078 comprise longitudinally outer edge surfaces 1096, 1097, 1098, and 1099, respectively. Right angle cutout portions 1091, 1092, 1093, 1094 are provided in panels 1074, 1075, 1081, and 1082 respectively. The cutout portions 1091, 1092, 1093, 1094 each comprise an outwardly positioned longitudinal edge surface 1102, 1103, 1104, 1105, an inwardly positioned longitudinal edge surface 1106, 1107, 1108, 1109 and a transversely extending edge surface 1110, 1111, 1112, 1113 connecting and perpendicular to associated outwardly and inwardly pssitioned longitudinal edge surfaces 1102 and 1106, etc. The cutout portions are constructed and arranged such that the cutouts are identical in size and shape and the length of a cutout longitudinal edge surface is less than the width of a cutout transverse edge surface but greater than one half the width, i.e. ½ W<L<W where W is the width and L is the length. This arrangement produces an overlapped seam 1220 as illustrated in FIG. 11 and described in further detail hereinafter.

Diagonal fold lines 1120–1127 are provided between the corners 1130–1137 formed by two associated longitudinally extending edge surfaces 1102, 1106 etc. and the associated transverse edge surface 1110 etc. of each cutout portion and an adjacent longitudinally inwardly positioned corner 1140–1147 of an associated panels 1074, 1075, 1081, 1082. The construction and arrangement of panel portions 1074, 1075, 1081, 1082 and cutouts 1091, 1092, 1093, 1094 are such that the diagonal fold lines bisect associated right angles at corners 1140–1147 forming two 45° angles, x and y, as illustrated at corner 1140 in FIG. 9. The diagonal fold lines divide each of panels 1074, 1075, 1081, 1082 into a midsection A, an outer wing section B, and an inner wing section C.

Each wing section B, C is bordered by portions of a longitudinal folding line which define a wing longitudinal folding edge 1150–1157. Each wing section B, C is also bordered by a portion of upper edge 1026 or lower edge 1028 which defines a wing outer edge 1160–1167. Each middle section A has a regular trapezoidal shape having a larger base 1170–1173 formed by an associated portion of upper or lower transverse line 1042, 1044 and a smaller base formed by associated cutout portion transverse edge surface 1110, 1111, 1112, 1113. The operations used in folding and sealing the blank 1010 to provide a carton 1020 are illustrated in FIGS. 10 through 13. The blank 1010 is initially folded into a rectangular tubular configuration by folding each of the longitudinal portions 1050, 1052, 1054, 1056, 1058 into right angle relationship with the adjacent longitudinal portion(s). Portion 1058 is positioned in overlapping relationship with portion 1050. In another embodiment (not shown) portion 1050 overlaps portion 1058. The folding between the longitudinal portions takes place along longitudinal fold lines 1032, 1034, 1036, 1038. The blank is thereafter sealed along seal line 1150 (which may be as wide as the overlap) affixing portion 1050 to portion 1058. In a preferred embodiment, the carton is constructed of the paper plastic composite, and seals are made by hot air, ultrasonic, radiation or other well known melting and/or welding process or by adhesives which bond opposite plastic surfaces of overlapping portions of the blank to one another. When cartons are used which do not have plastic on both face surfaces, the seals are made by adhesive bonding of opposed surfaces together.

Figure 12:
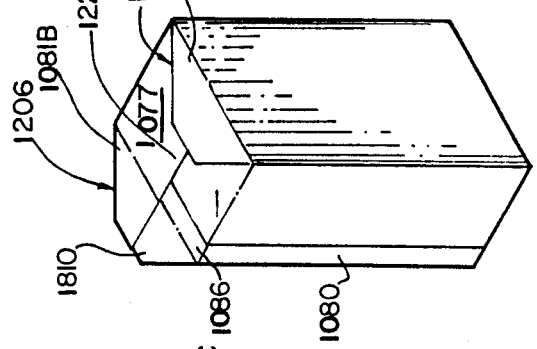
Figure 12A:
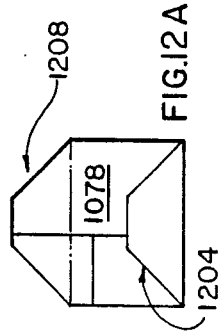
Figure 11:
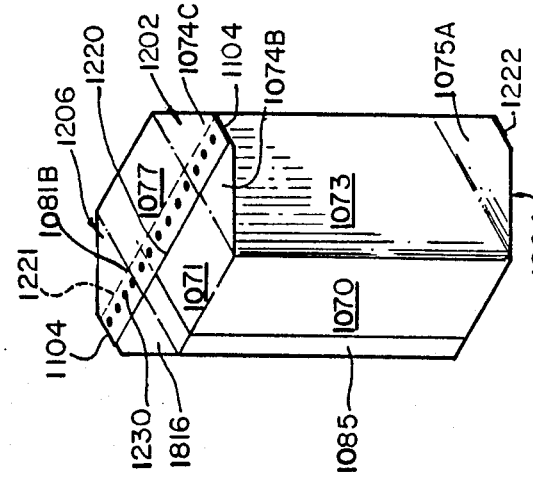
Figure 11A:
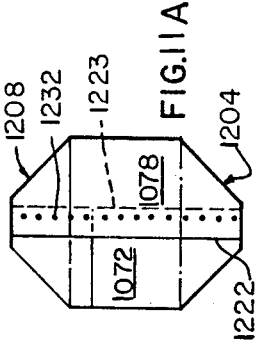
Figure 10:
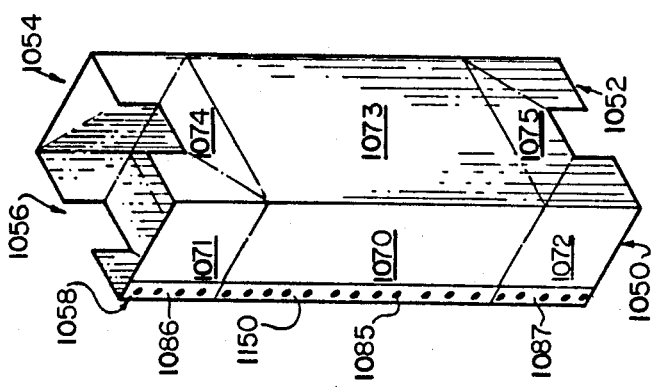

As illustrated by FIG. 11 the upper and lower portions 1062, 1066 of the blank are next folded into a planar perpendicular relationship with the lateral side surfaces by movement of panel mid-sections 1074A, 1075A, 1081A, 1082A in a laterally outward direction causing inward folding of the wing portions B and C of each associated panel 1074, 1075, 1081, 1082 about the associated diagonal fold lines 1120–1127. The panel portions 1074, 1075, 1081, 1082 are constructed and arranged such that the wing portions B, C when folded inwardly comprise an overlapping configuration having an identical shape to the mid-portion A. As discussed above, the length of each cutout longitudinal edge portions 1102, 1106, etc. is greater than one-half the width of an associated cutout transverse edge portion 1110, etc. portion. The length of each panel portion 1074, 1075, 1081, 1082 having a cutout therein is greater than one-half of its width. Each folded panel 1074, 1075, 1081, 1082 forms a multilayered trapezoidal tongue 1202, 1204, 1206, 1208. In the embodiment illustrated in FIGS. 11A–13A left top panel 1071 and associated wings 1074B, 1081B is folded inwardly slightly before right top panel 1077 and associated wings 1074C, 1081C. A straight outer seam line 1220 comprising edges 1161, 1089, and 1164 and a straight inner seam line 1221 comprising edges 1096, 1160, and 1165 are thus formed by this sequence of folding. (Of course, the order of folding could be reversed in which case the upper edges of left top panel 1071 and associated wings would form the outer seam.) Folding at the bottom portion of the blank, FIG. 11A, is provided in an identical manner to produce overlapped outer seam 1222 comprising edges 1163, 1099, and 1166 and inner seam 1223 comprising edges 1097, 1162 and 1167. A top seal 1230 is provided between seams 1220 and 1221 in generally parallel relationship therewith. Seal 1232 is similarly positioned between seams 1222 and 1223 at the carton bottom. Although shown figuratively as straight lines, the seals 1230, 1232 may extend over the entire width of the overlap. The laterally extending trapezoidal tongues 1202, 1204, 1206, 1208 formdd from panels 1074, 1075, 1081, 1082 are next folded inwardly as illustrated by FIGS. 12 and 13. The altitude of the trapezoidal mid portion A of each of panels 1074, 1075, 1081, 1082 in the preferred embodiment comprise a length equal to one-half the width of lateral side panels 1070 and 1076. Thus when the trapezoidal shaped panels 1074, 1075, 1081, 1082 are folded inwardly the inward edges thereof are positioned in abutting or near abutting contact forming seams 1240, 1242. As illustrated by FIG. 13, seal lines 1244, 1246, 1248, 1250 are provided perpendicular to seams 1240, 1242 fixedly sealing the wings 1202, 1204, 1206, 1208 to associated panels 1071, 1072, 1077, 1078 to complete carton 1020.

In a typical application of the embodiment of the invention illustrated in FIG. 9 wherein it is used as a one quart container, the transverse dimension of the carton blank between edges 1022 and 1024 is 13.000 inches; the transverse dimension of the first and third longitudinal portions of the carton is each 2.500 inches; the transverse dimension of the second and fourth longitudinal portions of the carton are each 3.750 inches; the transverse dimension of the fifth longitudinal portion of the carton is 0.500 inches; the total longitudinal dimension of the carton between edges 1026 and 1028 is 10.500 inches; the top and bottom transverse portions of the carton each have a longitudinal dimension of 2.125 inches and the middle transverse portion has addimension of 6.250 inches; each cutout portion has a transverse dimension of 1.250 inches and a longitudinal dimension of 0.875 inches.

Figure 14:
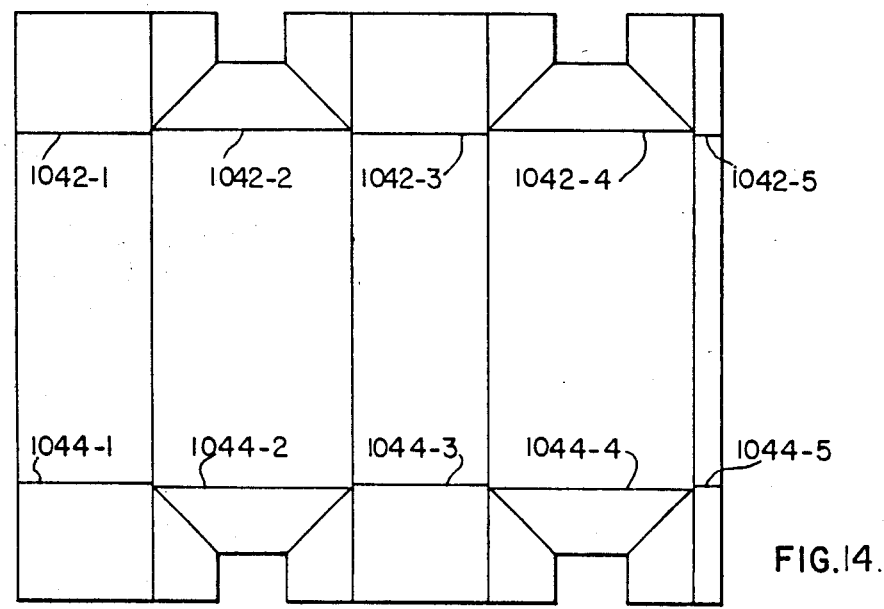
FIG. 14 is a plan view of another carton blank of the present invention.
Figure 18:
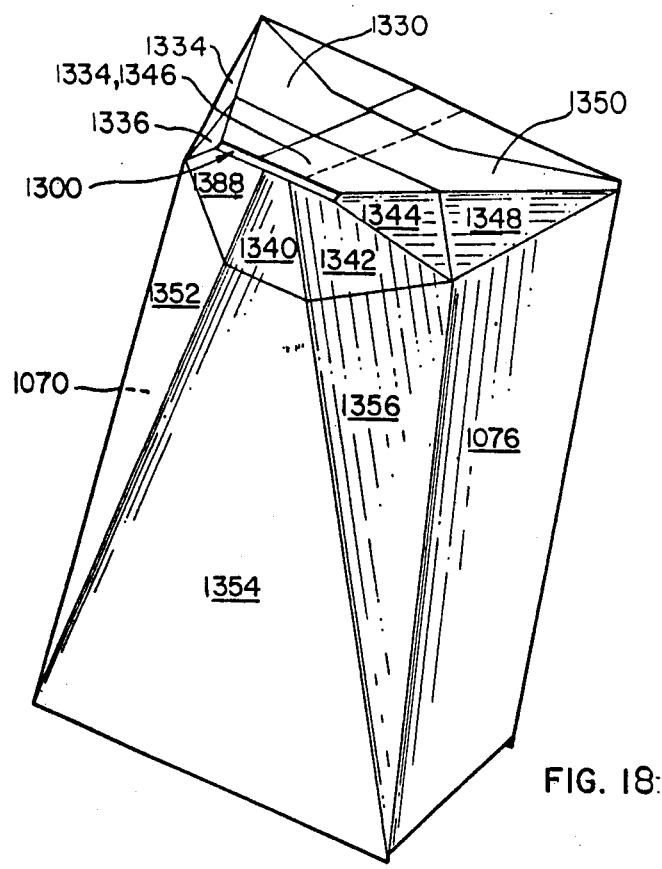
FIG. 18 is a perspective view of the carton illustrated in FIGS. 16 and 17.
Figure 16:
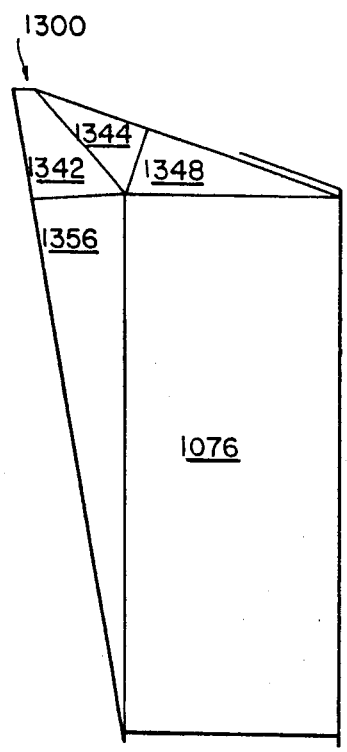
FIG. 16 is a side elevation view of a carton constructed from the carton blank of FIG. 15.
Figure 17:
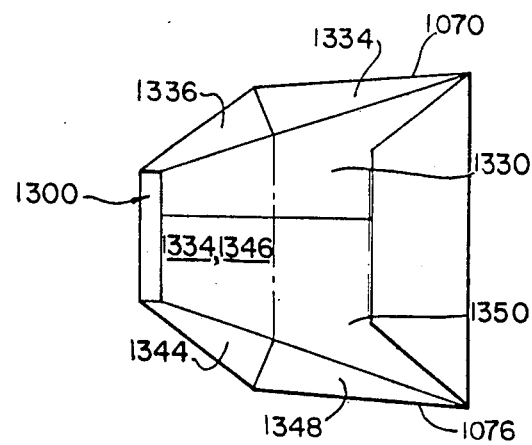
FIG. 17 is a top view of the carton illustrated in FIG. 16.

In another embodiment of the invention as illustrated in FIG. 14, upper and lower transverse fold lines 1042, 1044 are provided in a discontinuous, slightly offset arrangement. In this arrangement, the portions of the upper fold lines 1042-1, 1042-3, 1042-5 which are positioned within the first, third and fifth longitudinal portions of the carton, are located slightly inwardly of the portions of the fold line 1042-2 1042-4 which are positioned within the second and fourth longitudinal portions of the carton. Similarly, portions of the lower fold line 1044-1, 1044-3, 1044-5 positioned within the first, third and fifth longitudinal portions of the carton are located inwardly of the portions of the fold line 1044-2, 1044-4 positioned within the second and fourth longitudinal portions of the carton. This arrangement facilitates folding of the various panel members, making adjusmments for the thickness of the carton material. Of course, the amount of offset, i.e. the longitudinal distance between one portion of a transverse fold line and another portion, will be dependent upon the thickness of the associated carton blank, and in most cases will be greater than or equal to that thickness. For clarity, reference numerals other than those indicating transverse folding line portions have not been included in FIG. 14. However, the embodiment of FIG. 14, with the exception of discontinuous transverse fold lines 1042, 1044, is ddentical to the embodiment of FIG. 9. In a typical sse of the embodiment of the ineention as illustrated in FIG. 14, the dimensions may be identical to the dimensions as described above with reference to FIG. 9, except that transverse line portions 1042-1, 1042-3 and 1042-5 are positioned inwardly of transverse line portions 1042-2 and 1042-4, a distance of, for example, 0.125 inches.

Figure 15:
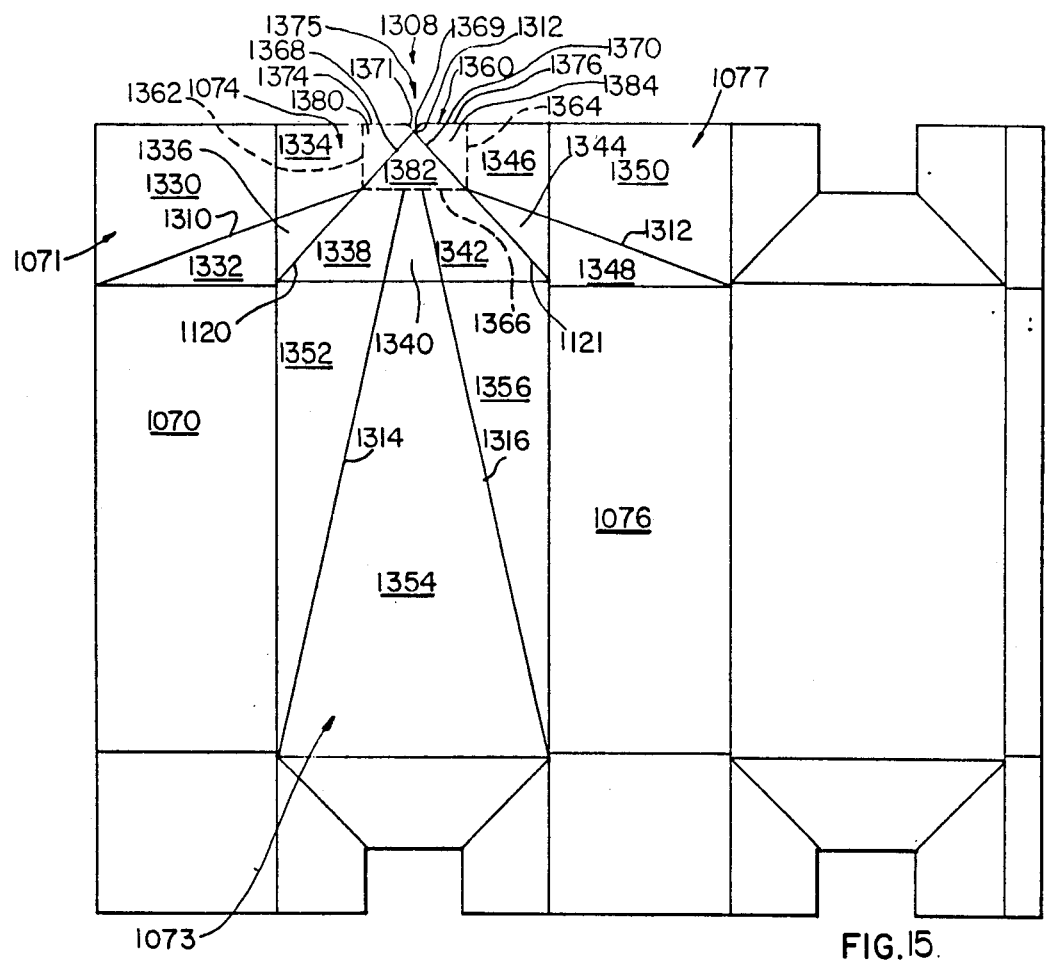
FIG. 15 is a plan view of yet another carton blank of the present invention.
Figure 22:
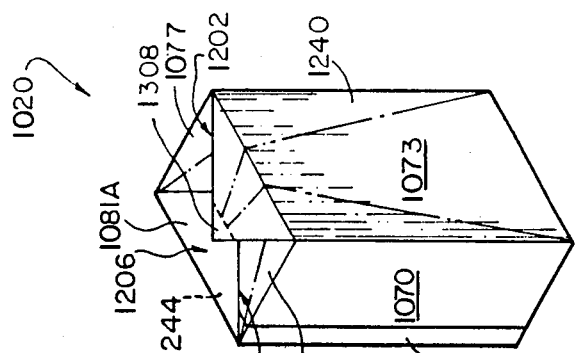
FIGS. 19-22 are perspective views illustrating the folding and sealing of the carton blan of FIG. 15 to form the carton illustrated in FIGS. 16-18.
Figure 21:
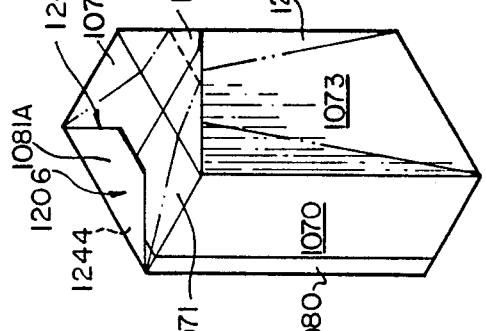
Figure 20:
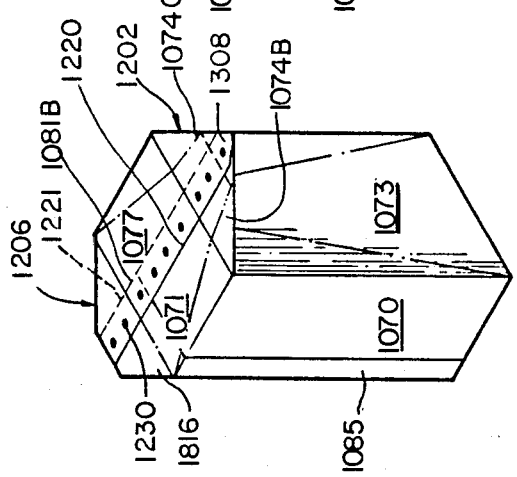
Figure 19:
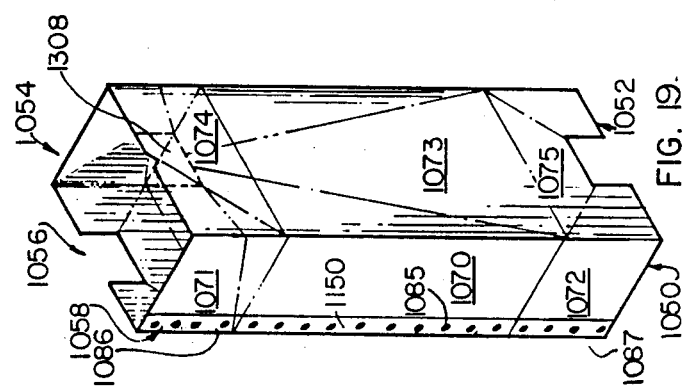
Figure 23:
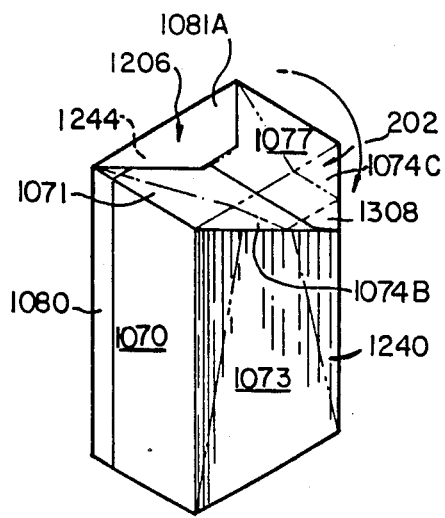
FIGS. 23-25 are perspective views illustrating the unfolding and tearing of the carton illustrated in FIG. 22 to form the carton pouring configuration of FIGS. 16-18.
Figure 24:
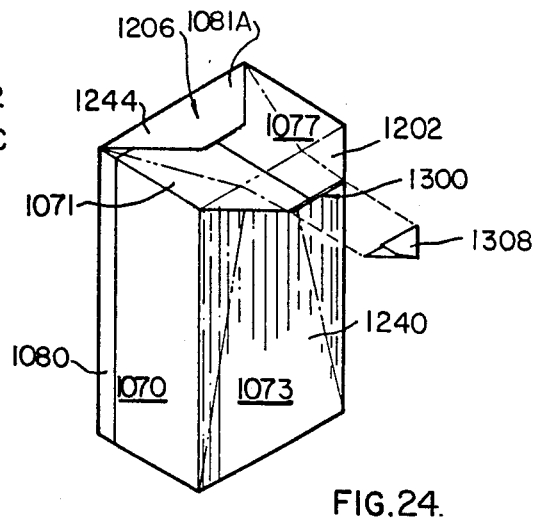
Figure 25:
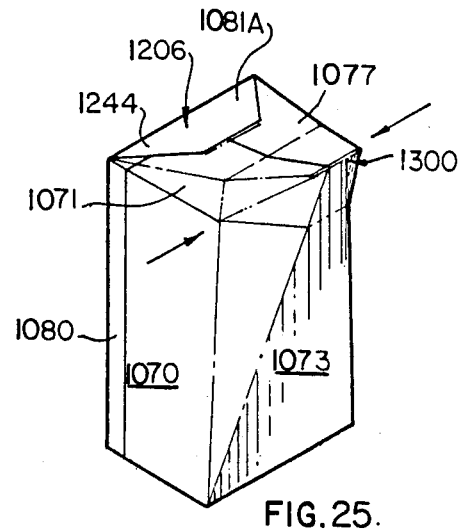

As illustrated in FIGS. 15, 16, 17 and 18, the carton blank of FIG. 9 may be provided in a configuration which is foldable into a carton having a pouring spout 1300, by the addition of folding lines 1310, 1312, 1314, 1316 and use of a perforated tab portion 1308 in place of cutout portion 1091. The remainder of the carton blank of FIG. 15 is identical to that of FIG. 9 and, again, many reference numerals have been excluded for purposes of clarity. A diagonally extending pour spout left upper fold line 1310 is provided, extending between the lower left corner of left top panel 1071 carton is identical to that described above with respect to FIGS. 10 through 13 but with the tab portion 1308 forming a triangular projection at the end of one of the tongues 1202. Sealing in wing portion 1202 is provided, initially, only between overlapping layers of the carton allowing fluid communication within the sides of an envelope defined by intersealed portions 1334, 1336, 1344, 1346, 1380, 1384, on one side and portions 1338, 1340, 1342, 1382 on the other side. Although a single line weld may be provided along the line illustrated generally by the numeral 1220, in a preferred embodiment, the carton is welded along the entire overlapping layer. A further welding may be provided at the tab portion to cause adhesion of all touching tab portion layers. As illustrated by FIG. 19, wing 1206 is folded inwardly prior to the folding of wing 1202, thus causing tab portion 1308 to be positioned at the exterior of the carton when folding is completed, as illustrated in FIG. 22. Since the wing portion 1202 containing the perforated tab portion 1308 must be folded outwardly after sealing to form the pouring spout 1300 illustrated in FIGS. 16 through 18, the attachment of wing portion 1202 to panel portions 1071, 1077 of a sufficiently weak to allow the wing portion 1202 to be pulled away from surfaces 1071, 1077 without rupture the carton. Thus, in a preferred embodiment, a relatively low strength adhesive is used to bond wing 1202 to surfaces 1071, 1077. The bonding of wing 1206 to surfaces 1071, 1077 may be provided in a similar manner, although in a preferred embodiment wing 1206 is sealed to portions 1071, 1077 by a bond of a substantially greater strength than that used to seal wing portion 1202 thereto. In use, as illustrated by FIG. 23, wing 1202 is pulled away from surfaces 1071, 1077 as by a person's grasping portion 1308 and pulling upwardly and outwardly thereon. Tab portion 1308 is next ripped from wing portion 1202 as illustrated in FIG. 24. Thereafter, the carton is urged into the configuration shown in FIG. 25 and in greater detail in FIGS. 16, 17, and 18 by application of inward pressure on the carton left and right lateral side surfaces 1070 and 1076. The carton may thereafter be urged back into the configuration illustrated in FIG. 24 by inwardly directed pressure on front and back lateral side panel portions 1073, 1080, thus forming a nominal seal at the formerly open spout 1300.

Thus it may be seen that a carton 1020 having a right regular parallelepiped shape may be formed from a unitary carton blank 1010. In one configuration, the carton may be provided with a pour spout formable entirely from the unitary carton blank 1010.

Figure 26:
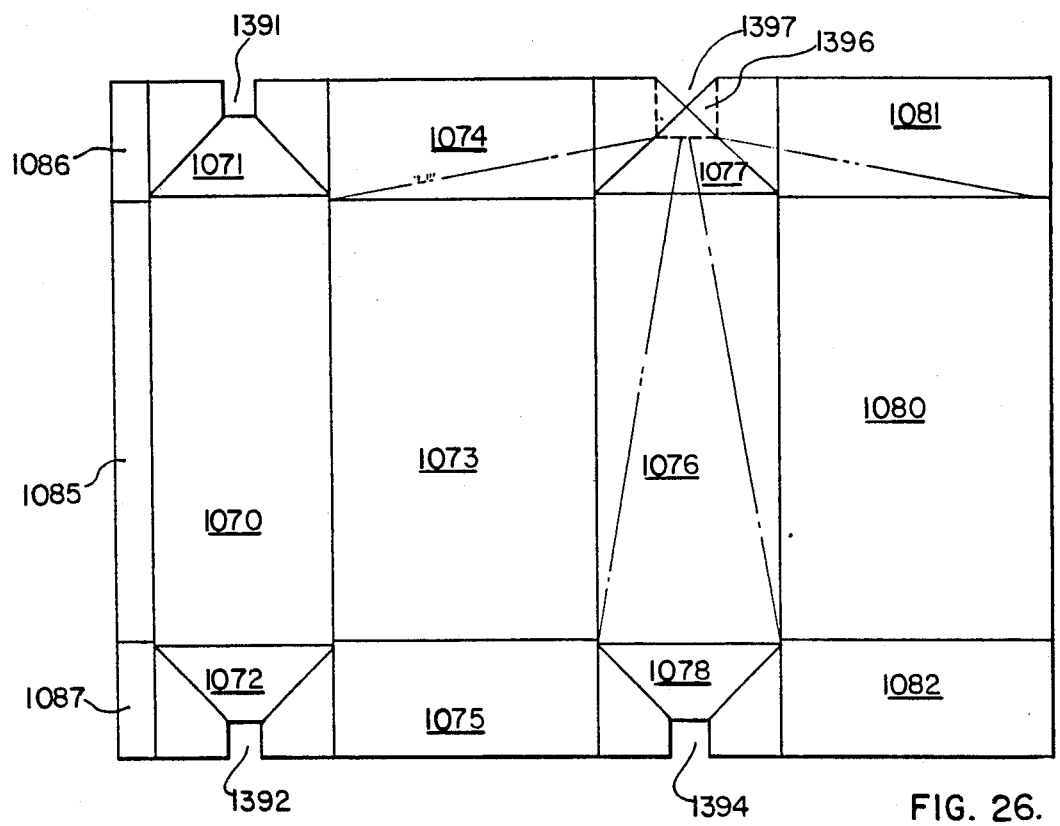
FIG. 26 is a plan view of still yet another carton blank of the present invention.

Of course a folding configuration and/or spout configuration of the same type as described above may be provided in a 90° rotated arrangement by placement of the cutout portions and/or the perforated spout portion in the left and right top and bottom panels 1071, 1072, 1077, 1078 rather than the front and back top and bottom panels 1074, 1075, 1081, 1082. A carton blank of such a configuration is illustrated in FIG. 26 in which cutouts 1391, 1392, 1394 are provided in panels 1071, 1072, 1078 respectively, and perforated tab portion 1396 with tab cutout 1397 are provided in panel portion 1077. The relationship of the fold lines and the cutout and perforated portions to the left and right longitudinal blank portions is the same as the relationship which these portions occupied with respect to the front and back longitudinal portions in the embodiments described hereinbefore with reference to FIGS. 17-20. In a typical application using the type of blank illustrated in FIG. 26 to form a one quart carton, the overall transverse dimension of the blank is 13.000 inches; panel portions 1085, 1086, 1087 have a transverse dimension of 0.500 inches; panel portions 1070, 1071, 1072 and 1076, 1077, 1078 have a transverse dimension of 2.500 inches; panel portions 1073, 1074, 1075 and 1080, 1081, 1082 each comprise a transverse dimension of 3.750 inches; the transverse dimension of cutouts 1391, 1392 and 1394 are each 0.500 inches and the transverse dimension of the perforated portion 1396 is 0.844 inches; the total longitudinal dimension of the blank is 9.250 inches; panel portions 1086, 1087, 1074, 1075 and 1081, 1082 each have a longitudinal dimension of 1.600 inches and panel portions 1071, 1072, 1077, 1078 each have a longitudinal dimension of 1.500 inches. Cutouts 1391, 1392 and 1394 each have a longitudinal dimension of 0.500 inches and perforated portion 1396 has a longitudinal dimension of 0.750 inches with cutout 1397 having a transverse dimension of 0.368 inches.

The folding, sealing and use sequence for the embodiment illustrated in FIG. 26 is identical to that illustrated in FIGS. 19 through 25, except that the relative position of the folding flaps and/or pouring spout is rotated 90°, so that pouring take place at one of the narrower longitudinal portions of the carton 1020.

What is claimed is:

1. A device for forming a moving web of laminated composite material having weakened zones therein from a moving continuous web of relatively extensible plastic film material having identical sets graphics printed on nominally constant length repeat length portions thereof which are subject to length variation from a constant design repeat length distance and a moving continuous web of relatively nonextensible paper material, said film material and said paper material each having a lamination surface to be laminated to an opposed surface of the other material and an exposed surface for forming an exterior surface of the laminated composite, said device comprising:

(a) paper supply means for providing a continuous web of paper to be laminated, said paper supply means defining the upstream end of said paper web;

(b) film supply means for providing a continuous web of film to be laminated, said film supply means defining the upstream end of said film web;

(c) cutter means defining a cutter nip for repeatingly cutting spaced apart perforated patterns in said paper web at one design repeat length distance intervals;

(d) adhesive supply means for applying adhesive material to at least one of said film web lamination surface and said paper web lamination surface;

(e) laminating nip means for engaging and moving said paper web and said film web in parallel aligned relationship at equal speeds and for laminating said paper web to said film web for forming a laminated composite;

(f) registration means for providing accurate registry of said perforated pattern portions of said paper web with predetermined, spaced apart, repeating target areas on said film web located at an identical position within each said set of film graphics, at said laminating nip means;

(g) composite transport means for continuously moving said composite web from said laminating nip means;

(h) whereby a continuous composite web comprising a paper web portion and a film web portion and having weakened zones therein associated with said spaced apart perforated patterns in the paper web portion thereof is provided.

2. The invention of claim 1 wherein said registration means comprises phasing means for controlling the phasing of said perforated patterns and said target areas including:

(a) perforated pattern detection means positioned at a predetermined point along the paper web downstream said cutter means and upstream said laminating means for detecting the position of said perforated patterns relative said laminating means and outputting a signal in response thereto;

(b) target area detection means positioned at a predetermined point along said film web upstream said laminating means for detecting the position of said target areas relative said laminating means and outputting a signal in response thereto;

(c) film web variable tension means positioned upstream said laminating nip for selectively stretching or shrinking a portion of the film web passing therethrough;

(d) data processing means for receiving and processing signals from said perforated pattern detection means and said target area detection means for determining phasing error and for providing control commands to said film variable tension means responsive to said determined phasing error whereby said film web variable tension means is controlled to position said perforated patterns in registry with said target areas in a phasing control mode of operation.

3. The invention of claim 2 wherein said registration means comprises repeat length control means for maintaining the length of repeat length portions of the film web within a predetermined tolerance of said design repeat length distance at the point where the film web enters said laminating nip comprising:

repeat length distance measuring means for measuring the repeat length distance of each repeat length portion of the film web at a position along the film web proximate said laminating nip and for outputting a signal representative of said measured distance to said data processing means;

wherein said data processing means compares said measures repeat length distance values to said design repeat length distance value for determining repeat length error and wherein said data processing means provides control commands to said film variable tension means responsive to said determined repeat length error whereby said film web variable tension means is controlled to stretch or shrink the film web to maintain the repeat length distance of each repeat length portion substantially at said design repeat length distance.

4. The invention of claim 3:

(a) wherein said perforated pattern detection means comprises first photoelectric sensing means for sensing the passage of said perforated patterns;

(b) wherein said target area detection means comprises second photoelectric sensing means for sensing the passage of preprinted marks associated with said target areas;

(c) wherein said phasing means further comprises web travel monitoring means for monitoring the web travel distance of at least one of said moving webs and for outputting a web distance monitoring signal to said data processing means in response thereto;

(d) wherein a phasing error determination comprises measuring the web travel distance occurring between the sensing of a target area and the sensing of a perforated pattern.

5. The invention of claim 4 wherein said web travel monitoring means comprises encoder means for providing a machine speed based electronic pulse train having a frequency proportional to the rotational speed of said laminating nip means.

6. The invention of claim 3 wherein said repeat length distance measuring means comprises a photoelectric sensing means for sensing the passage of preprinted marks associated with said target areas and film web travel monitoring means for monitoring the film web travel occuring between the detection of adjacent register marks by said photoelectric sensing means.

7. The invention of claim 3 wherein said film web variable tension means comprises:

said laminating nip means;

film web entry nip means for nippingly engaging the film web at a point upstream of said laminating nip means;

film web entry nip speed control means for selectively varying the surface speed of said film web entry nip means relative the surface speed of said laminating nip means for selectively varying the tension in the film web portion positioned between said film web entry nip means and said laminating nip means.

8. The invention of claim 3 wherein said registration means comprises mode shifting means for selectively shifting operation of said registration means between a phasing control mode of operation and a repeat length control mode of operation.

9. The invention of claim 8 wherein said registration means shifts operating modes based upon criteria which include the absolute value of determined repeat length errors and the ratio between contemporaneously determined repeat length errors and phasing errors.

10. The invention of claim 3 further comprising means for applying a sealing layer to said exposed surface of said paper material for forming a composite material comprising a perforated paper layer positioned between two plastic layers.

11. The invention of claim 10 wherein said means for applying a sealing layer comprise coating means for applying a liquid sealing coat to said exposed surface of said paper web.

12. The invention of claim 10 wherein said means for applying a sealing layer comprises second laminating means for lamnating a second film web to said exposed surface of said paper web and second film web supply means for providing a continuous second web of film to be laminated to said paper web.

13. A method of forming a moving web of laminated composite having weakened zones therein from a moving web of relatively nonextensible paper material and a moving web of relatively extensible film material having repeating sets of graphics positioned in nominally constant length repeat length portions thereof and having target areas with a predetermined size, shape, and position within each repeating set of graphics, comprising the steps of:
  (a) moving the paper web at a predetermined speed;
  (b) moving the film web into touching parallel aligned relationship with the paper web at a speed equal to the speed of the paper web;
  (c) at a position on the moving paper web upstream from the point of initial parallel touching contact of the two webs, cutting perforated patterns on the moving paper web with identical shape and spacing as said target areas on the moving film web;
  (d) at a control region along the moving film web upstream from the point of initial touching contact of the two webs periodically adjusting the tension in the film web to selectively stretch or shrink the film web passing through the control region to provide accurate registry of said perforated patterns with said target areas at the point of parallel touching contact;
  (e) coating at least one of the touching surfaces of the moving paper web and moving film web with an adhesive agent upstream of the point where the paper web and film web are brought into parallel touching contact;
  (f) compressing the moving paper web and film web at the point of parallel touching contact to form a laminated composite having weakened zones therein corresponding to the perforated patterns cut in the paper web and the associated target areas on the film web.

14. The invention of claim 13 further comprising the steps of:
  (a) detecting the passage of target areas past a predetermined fixed position relative the film web upstream of the point of initial touching contact of the two webs;
  (b) generating a target area monitoring signal based on the detection of the target areas;
  (c) detecting the passage of perforated patterns past a predetermined fixed position relative the paper web upstream of the point of initial touching contact of the two webs;
  (d) generating a pattern monitoring signal based on the detection of the perforated patterns;
  (e) comparing the target area monitoring signal with the perforated pattern monitoring signal to determine phasing error value;
  (f) generating a phasing control signal based on said phasing error value;
  (g) controlling the tension in the film web control region in response to the phasing control signal in a phasing control mode of operation.

15. The invention of claim 14 further comprising the steps of:
  (a) monitoring the passage of reference marks associated with each repeat length portion of the film web at a position proximate the point of initial touching cnntact of the two webs and generating a repeat length reference mark monitoring signal indicative thereof;
  (b) generating a web travel signal indicative of the distance of web travel occurring between selected points in time;
  (c) determining the actual repeat length of each repeat length portion of the film web based upon the web travel signal and the reference mark monitoring signal;
  (d) comparing the determined repeat length distance of each repeat length portion to a design repeat length distance equal to the interval spacing of perforated pattern on the paper web to determine a repeat length error value;
  (e) generating a repeat length control signal based on said repeat length error value;
  (f) controlling the tension in the film web control region in response to the phasing control signal in a phasing control mode of operation.

16. The invention of claim 15 comprising the further step of changing between the phasing control mode of operation and the repeat length control mode of operation based upon a comparison of phasing error values to repeat length error values.

17. The invention of claim 16 wherein controlling the tension in the control region of the film web comprises varying the surface velocity of one pair of film web engaging rolls defining an upstrea end of the control region with respect to the velocity of another pair of film web engaging rolls defining a downstream end of the control region.

18. The invention of claim 17 further comprising the step of:
  applying a sealing layer to the surface of the paper layer opposite the surface thereof which is laminated to the film web so as to form a composite having a paper layer with perforated patterns cut therein positioned between a film layer and a sealing layer.

19. The method of claim 18 wherein the step of applying a sealing layer to the paper web comprises the step of applying a liquid coating layer to the paper web.

20. The method of claim 18 wherein the step of applying a sealing layer to the paper web comprises laminating a second plastic film layer to the paper web.

* * * * *